(12) United States Patent
Kudoh et al.

(10) Patent No.: US 9,748,596 B2
(45) Date of Patent: Aug. 29, 2017

(54) SINGLE LAYER SECONDARY BATTERY HAVING A FOLDED STRUCTURE

(71) Applicants: KABUSHIKI KAISHA NIHON MICRONICS, Tokyo (JP); GUALA TECHNOLOGY CO., LTD., Hyogo-Ken (JP)

(72) Inventors: Takuo Kudoh, Tokyo (JP); Kiyoyasu Hiwada, Tokyo (JP); Shozo Izumo, Tokyo (JP); Tomokazu Saito, Tokyo (JP); Akira Nakazawa, Hyogo-Ken (JP)

(73) Assignees: Kabushiki Kaisha Nihon Micronics, Tokyo (JP); Guala Technology Co., Ltd., Hyogo-Ken (JP)

( * ) Notice: Subject to any disclaimer, the term of this patent is extended or adjusted under 35 U.S.C. 154(b) by 33 days.

(21) Appl. No.: 14/395,959

(22) PCT Filed: Apr. 25, 2013

(86) PCT No.: PCT/JP2013/062179
§ 371 (c)(1),
(2) Date: Oct. 21, 2014

(87) PCT Pub. No.: WO2013/161927
PCT Pub. Date: Oct. 31, 2013

(65) Prior Publication Data
US 2015/0111108 A1    Apr. 23, 2015

(30) Foreign Application Priority Data
Apr. 27, 2012    (WO) .................. PCT/JP2012/061359

(51) Int. Cl.
*H01M 10/0562*    (2010.01)
*H01M 10/04*    (2006.01)
(Continued)

(52) U.S. Cl.
CPC ....... *H01M 10/0431* (2013.01); *H01M 2/263* (2013.01); *H01M 10/045* (2013.01);
(Continued)

(58) Field of Classification Search
None
See application file for complete search history.

(56) References Cited

U.S. PATENT DOCUMENTS 5,300,373 A * 4/1994 Shackle .................. H01M 2/26
429/152
5,478,668 A * 12/1995 Gozdz ........................ C08J 9/28
429/127
(Continued)

FOREIGN PATENT DOCUMENTS

CN    2538072 Y    2/2003
JP    06-290780 A    10/1994
(Continued)

OTHER PUBLICATIONS

English Translation of JP10-302828 1998.*
(Continued)

*Primary Examiner* — Lucas J. O'Donnell
(74) *Attorney, Agent, or Firm* — Bacon & Thomas, PLLC

(57) ABSTRACT

Provided is a secondary battery adopting an all-solid-state secondary cell structure with a storage layer sandwiched between a positive electrode layer and a negative electrode layer and which is superior to a conventional secondary battery with respect to at least one of volume, manufacturing, and positioning. The present invention provides a secondary battery including a single-layer secondary cell having a folded structure that a sheet-shaped single-layer secondary cell with a storage layer sandwiched between a positive electrode layer and a negative electrode layer is folded in two or four. Here, it is preferable that a plurality of (Continued)

the single-layer secondary cells each having the folded structure are arranged in parallel and adjacent single-layer secondary cells each having the folded structure are electrically connected directly or via a positive electrode terminal member or a negative electrode terminal member, so that at least one of current capacity increasing and terminal voltage heightening is achieved.

12 Claims, 23 Drawing Sheets

(51) Int. Cl.
*H01M 2/26* (2006.01)
*H01M 14/00* (2006.01)
*H01M 10/0583* (2010.01)
*H01M 10/0525* (2010.01)

(52) U.S. Cl.
CPC ... *H01M 10/0454* (2013.01); *H01M 10/0459* (2013.01); *H01M 14/005* (2013.01); *H01M 10/0525* (2013.01); *H01M 10/0562* (2013.01); *H01M 10/0583* (2013.01); *Y02E 60/122* (2013.01); *Y02P 70/54* (2015.11)

(56) References Cited

U.S. PATENT DOCUMENTS

| | | | |
|---|---|---|---|
| 5,498,489 A | 3/1996 | Dasgupta et al. | |
| 6,808,843 B2* | 10/2004 | von During | H01M 10/052 429/127 |
| 8,440,356 B2* | 5/2013 | Kim | H01M 10/0413 29/623.1 |
| 2009/0053592 A1* | 2/2009 | Mino | H01M 2/263 429/161 |
| 2010/0067089 A1 | 3/2010 | Nakazawa | |
| 2013/0224596 A1 | 8/2013 | Nakazawa | |

FOREIGN PATENT DOCUMENTS

| | | |
|---|---|---|
| JP | 10-302828 | 11/1998 |
| JP | 2002-042855 A | 2/2002 |
| JP | 2002-093404 A | 3/2002 |
| JP | 2009-140707 A | 6/2009 |
| TW | M352782 | 3/2009 |
| WO | WO94/07276 A1 | 3/1994 |
| WO | WO 97/08769 A1 | 3/1997 |
| WO | WO2008/053561 A1 | 5/2008 |
| WO | WO2012/046325 A1 | 4/2012 |

OTHER PUBLICATIONS

English Translation of JP06-290780 1994.*
p. 3 of Korean First Office Action dated Sep. 17, 2015 in corresponding Korean Patent Appln. No. 2014-7025646.
p. 1 of Canadian First Office Action dated Aug. 27, 2015 in corresponding Canadian Patent Appln. No. 2,870,820.
Battery Handbook; Edited by the Committee of Battery Technology in the Electrochemical Society of Japan; Chapter VI; Part VI; "Nickel-metal hydride battery"; p. 319, 1.26-39; Translation of International Search Report in PCT/JP2013/161927.
Supplementary Extended European Search Report dated Nov. 30, 2015 in Corresponding European Patent Application No. 13781622.9.

* cited by examiner

1A

1B

7 Seal
2 Positive electrode layer
6 Storage layer (Charging layer)
3 Negative electrode layer FIG.30A1
FIG.30B1
FIG.30C1
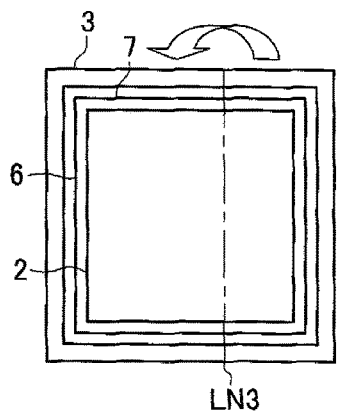
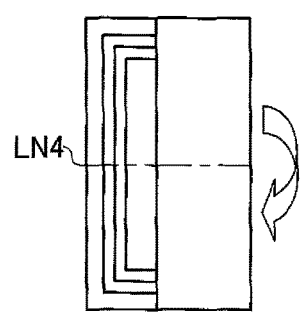
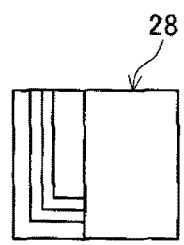
FIG.30A2
FIG.30B2
FIG.30C2
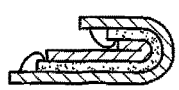
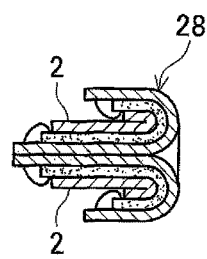
FIG.31
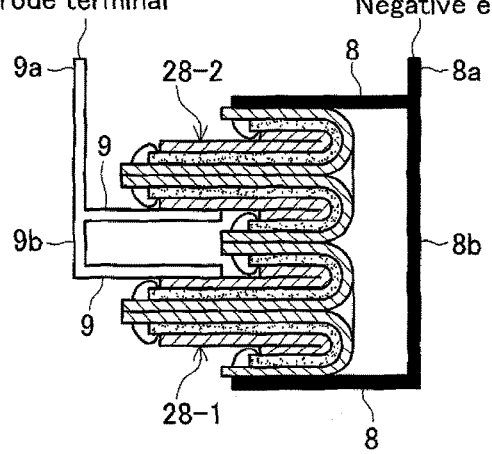

7 Seal  2 Positive electrode layer  31
6 Charging layer
3 Negative electrode layer Negative electrode terminal    20V    Positive electrode terminal

SINGLE LAYER SECONDARY BATTERY HAVING A FOLDED STRUCTURE

TECHNICAL FIELD

The present invention relates to a secondary battery, and for example, relates to a secondary battery (hereinafter, called a quantum battery) based on an operational principle of forming a new energy level in a band gap and capturing an electron by utilizing a photoexcited structural change of a metal oxide.

BACKGROUND ART

There have been known nickel-metal hydride (Ni-MH) batteries, lithium ion secondary batteries (LIB), and the like as secondary batteries. Recently, there is a need for small and high-capacity batteries. Accordingly, in some cases, a plurality of units (hereinafter, called single-layer cells) each functioning as a secondary cell are superposed.

Structures of a cylindrical type and a rectangular type of nickel-metal hydride (Ni-MH) batteries as illustrated in FIGS. 1 and 2 are disclosed on pages 319-320 in Non-Patent Document 1. A cylindrical type battery 1A is completed as a battery by winding a positive electrode 2 and a negative electrode 3 each being thin-plate-shaped to have a predetermined shape in whorl via a separator 4 (the whorl being perceived as superposed single-layer cells), inserting the whorl into a cylindrical case 5, and performing sealing after an electrolyte is poured therein. A rectangular battery 1B is completed as a battery by layering structures each having a separator 4 between a positive electrode 2 and a negative electrode 3 each being thin-plate-shaped to have a predetermined shape, inserting the structures into a rectangular case 5, and performing sealing after an electrolyte is poured therein.

In Patent Document 1, there is disclosed an internal structure (electrode plate group) of a rectangular lithium ion secondary battery as illustrated in FIG. 3. In the electrode plate group 1C, positive electrode plates 2 and negative electrode plates 3 are alternately inserted to valley grooves of a continuous body of a zigzag-folded separator 4 and flattened by being pressed in a zigzag direction. Such an electrode plate group is inserted into a rectangular external enclosure and sealing is performed after an electrolyte is poured therein to complete a rectangular battery.

Further, recently, all-solid-state secondary cells structured with solid thin films have been researched and developed as being expected to actualize downsized secondary cells. FIG. 4 is a perspective view and a sectional view illustrating a structure of an all-solid-state secondary cell. In FIG. 4, terminal members such as a positive electrode terminal and a negative electrode terminal, mounting members such as an external member and a cover member, and the like are not illustrated. An all-solid-state secondary cell 1D includes a solid layer (hereinafter, called a storage layer) 6 in which internal change occurs during charging and discharging between a negative electrode layer 3 and a positive electrode layer 2. Examples of the all-solid-state secondary cell 1D include a quantum cell described above and an all-solid-state lithium ion secondary cell. In a case of a quantum cell, a layer (called a charging layer as described later) to store (capture) electrons with a charging operation and to release the charged electrons with a discharging operation is arranged between the negative electrode layer 3 and the positive electrode layer 2. The charging layer corresponds to the storage layer 6. In a case of the all-solid-state lithium ion secondary cell, a solid electrolyte layer is arranged between the negative electrode layer 3 and the positive electrode layer 2. The solid electrolyte layer corresponds to the storage layer 6. Here, in a case that the structure illustrated in FIG. 4 is to be layered as a single-layer cell, it is preferable that a seal 7 is arranged around the storage layer 6 and the like for providing insulation between the negative electrode layer 3 and the positive electrode layer 2 and for protecting the periphery of the storage layer 6. Here, the seal 7 is not an essential structural element.

As is widely known, regarding the all-solid-state secondary cell 1D as well, terminal voltage can be heightened by layering single-layer cells in series and current capacity can be increased by layering single-layer cells in parallel.

FIG. 5 is a sectional view illustrating an easily-anticipatable secondary battery 1E in which a plurality of single-layer cells are serial-connected with each single-layer cell being the secondary cell 1D. In the secondary battery 1E, a lower face of the negative electrode layer 3 of an intermediate single-layer cell 1D is in contact with an upper face of the positive electrode layer 2 of a single-layer cell at the one-stage lower side therefrom. A lower face of the negative electrode layer 3 of a single-layer cell at the lowermost stage is in contact with an upper face of a negative electrode terminal plate or a negative electrode terminal layer (hereinafter, called a negative electrode terminal plate) 8. An upper face of the positive electrode layer 2 of a single-layer cell at the uppermost stage is in contact with an upper face of a positive electrode terminal plate or a positive electrode terminal layer (hereinafter, called a positive electrode terminal plate) 9. The negative electrode terminal plate 8 and the positive electrode terminal plate 9 include extension portions 8a, 9a, respectively, for exposing the negative electrode terminal and the positive electrode terminal to the outside of a mounting member (not illustrated). Assuming that the secondary cell 1D has terminal voltage $V_0$ and current capacity $I_0$ ($=I \times t$ (Ah)), and the number (serial-connected number) of layers of the secondary cells 1D is N, terminal voltage of the secondary battery 1E becomes to $N \times V_0$ (e.g., $6V_0$ if the number of layers is six) while current capacity $I_0$ thereof remains at $I_0$.

FIG. 6 is a sectional view illustrating an easily-anticipatable secondary battery 1F in which a plurality of single-layer cells are parallel-connected with each single-layer cell being the secondary cell 1D. In the secondary battery 1F, each single-layer cell 1D is sandwiched between the negative electrode terminal plate 8 and the positive electrode terminal plate 9, and further, an insulation layer 10 is arranged between the positive electrode terminal plate 9 of a single-layer cell and the negative electrode terminal plate 8 of a single-layer cell at the one-stage upper side therefrom. A plurality of the negative electrode terminal plates 8 are connected by a negative electrode terminal connection portion 8b and a plurality of the positive electrode terminal plates 9 are connected by a positive electrode terminal connection portion 9b. The negative electrode terminal connection portion 8b and the positive electrode terminal connection portion 9b include extension portions 8a, 9a, respectively, for exposing the negative electrode terminal and the positive electrode terminal to the outside of a mounting member (not illustrated). Assuming that the secondary cell 1D has terminal voltage $V_0$ and current capacity $I_0$, and the number (parallel-connected number) of layers of the secondary cells 1D is N, capacity of the secondary battery 1F becomes to $N \times I_0$ (e.g., $6I_0$ if the number of layers is six) while terminal voltage thereof remains at $V_0$.

To actualize a secondary battery having high terminal voltage and large current capacity, single-layer cells are simply required to be arranged in combination of a multi layer in serial connection and a multilayer in parallel connection. Here, for example, owing to that a single-layer cell 1D sandwiched between the negative electrode terminal plate 8 and the positive electrode terminal plate 9 in FIG. 6 is replaced with a multilayer of a plurality of single-layer cells in serial connection, it is possible to structure a secondary battery having higher terminal voltage and larger current capacity.

CITED DOCUMENT

Patent Document

Patent Document 1: Japanese Patent Application Laid-Open No. 2009-140707

Non-Patent Document

Non-Patent Document 1: Committee of Battery Technology in Electrochemical Society (February 2010): Battery handbook. Ormsha, Ltd.

SUMMARY OF THE INVENTION

In the conventional secondary battery illustrated in FIGS. 1 to 3, it is required to arrange a separator for providing insulation between a positive electrode and a negative electrode of adjacent single-layer cells and to ensure accommodation space for an electrolyte. Accordingly, it has been difficult to reduce whole volume of the secondary battery. In the secondary battery illustrated in FIGS. 1 to 3, since chemical reaction is utilized, deterioration of charging/discharging performance and reduction of lifetime may be caused. Further, since an electrolyte is used, there may be a risk of fluid leakage. Furthermore, in a lithium ion secondary battery, there is a fear of reliability degradation due to overcharging and charging/discharging, and short-circuit occurrence between electrodes due to usage of an electrolyte.

Most of problems caused by using an electrolyte can be solved by using an all-solid-state secondary cell.

As described above, current capacity of a secondary battery can be increased by parallel-connecting a plurality of single-layer cells. However, in the secondary battery 1F as illustrated in FIG. 6, it is required to arrange an insulation layer 10 between the negative electrode terminal plate 8 and the positive electrode terminal plate 9 of adjacent single-layer cells. Further, it is required to arrange the negative electrode terminal plates 8 as the same number of the negative electrode layers 3 of the single-layer cell and to arrange the positive electrode terminal plates 9 as the same number of the positive electrode layers 2 of the single-layer cell. Accordingly, volume of the secondary battery 1F is increased.

In general, volume efficiency of a battery is obtained as a ratio of effective volume of the battery to whole volume of the battery. In consideration of cycles of charging a secondary battery, it is required for the secondary battery to have large current capacity. Here, it is preferable that whole volume of the battery is small even though current capacity is increased. Further, reduction of whole volume of the battery contributes to downsizing of the secondary battery. Here, the negative electrode terminal plates 8 and the positive electrode terminal plates 9 are necessary for structuring a battery. However, the insulation layers 10 are arranged reluctantly. This is a major cause to decrease volume efficiency.

It is possible to increase the number of layers of single-layer cells in parallel connection in accordance with increase of desired current capacity. However, the number of the insulation layers 10 is increased (as well as the number of the negative electrode terminal plates 8 and the positive electrode terminal plates 9) in accordance with increase of the number of layers. As a result, whole volume is further increased.

In either parallel connection or serial connection, a secondary battery in which a plurality of single-layer cells are layered has high requirements for positioning of the respective single-layer cells. In a case of the secondary battery 1F illustrated in FIG. 6, it is preferable, from a viewpoint of reducing whole volume, that the negative electrode terminal connection portions 8b and the positive electrode terminal connection portions 9b are arranged closer to the single-layer cells 10 (i.e., a gap L in FIG. 6 is smaller). For example, if any of the single-layer cells is layered as being shifted rightward in FIG. 6 and the negative electrode layer 3 of the single-layer cell is contacted to the positive electrode terminal connection portion 9b, a short-circuit is formed thereat. Thus, the respective single-layer cells have high requirements for positioning. Accordingly, there may be a possibility to cause decrease of manufacturing efficiency.

Further, owing to that single-layer cells as the number of layers have to be layered in a layering process, there has been large workload for manufacturing.

In such a situation, there has been desired a secondary battery in which a single-layer secondary cell has an all-solid-state secondary cell structure with a storage layer sandwiched between a positive electrode layer and a negative electrode layer and which is superior to a conventional secondary battery with respect to at least one of volume, manufacturing, and positioning.

To solve such problems, a secondary battery of the present invention includes a single-layer secondary cell having a folded structure that a sheet-shaped single-layer secondary cell with a storage layer sandwiched between a positive electrode layer and a negative electrode layer is folded in two or four.

Here, it is preferable to achieve at least one of current capacity increasing and terminal voltage heightening owing to that a plurality of single-layer secondary cells each having the folded structure are arranged in parallel and adjacent single-layer secondary cells each having the folded structure are electrically connected directly or via a positive electrode terminal member or a negative electrode terminal member.

Since the single-layer secondary cell having a folded structure is adopted, the secondary battery of the present invention produces some of effects such as reducing volume as eliminating or lessening insulation layers, improving manufacturing efficiency as reducing a component count, and improving positioning accuracy as inserting a positive electrode terminal member or a negative electrode terminal member to a folding gap generated by folding.

BRIEF DESCRIPTION OF THE DRAWINGS

FIG. 30 is an explanatory view of a method of forming a partial four-fold single-layer quantum cell which is applied to a secondary battery of the sixteenth embodiment.

FIG. 31 is a front view illustrating a structure of a secondary battery of a seventeenth embodiment.

EMBODIMENTS OF THE INVENTION (A) Quantum Cell

A secondary battery of each embodiment described in the following adopts a quantum cell technology. Here, brief description will be provided on a quantum cell before describing the respective embodiments.

As described above, a quantum cell is a secondary cell based on an operational principal of forming a new energy level in a band gap and capturing an electron by utilizing a photoexcited structural change of a metal oxide.

Figure 1:
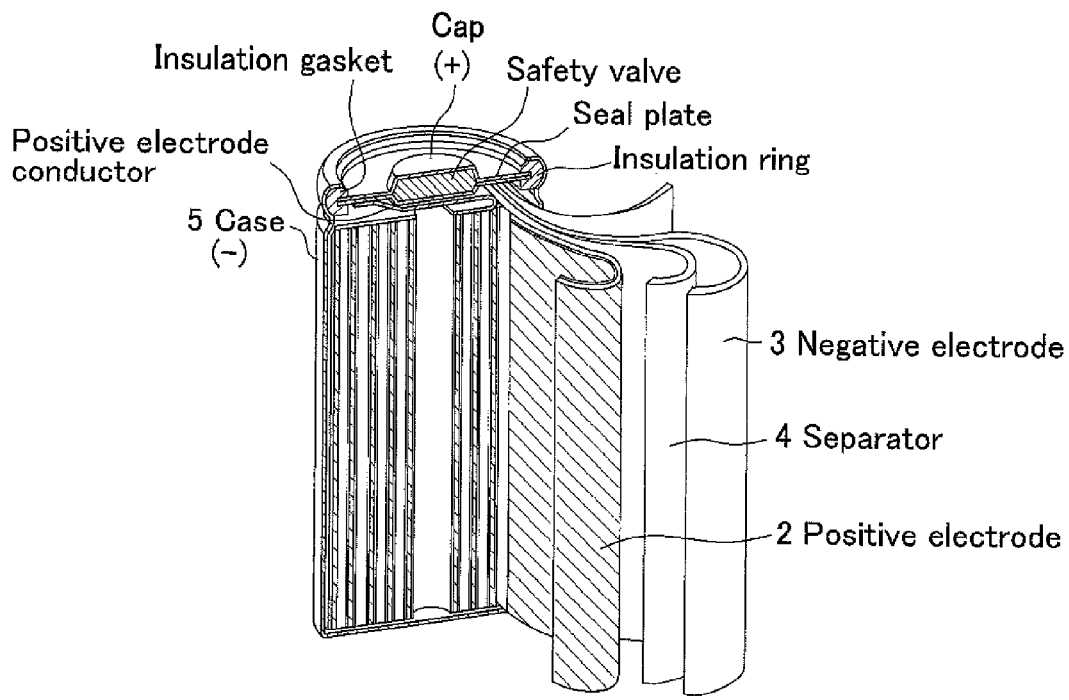
FIG. 1 is a perspective view illustrating an internal structure of a conventional cylindrical nickel-metal hydride (Ni-MH) battery with a part thereof broken.
Figure 2:
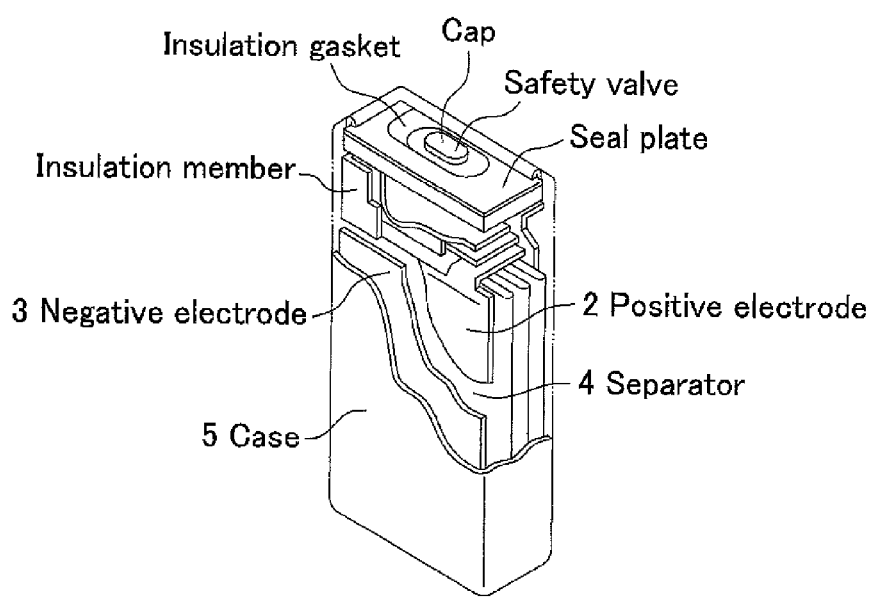
FIG. 2 is a perspective view illustrating an internal structure of a conventional rectangular nickel-metal hydride (Ni-MH) battery with a part thereof broken.
Figure 3:
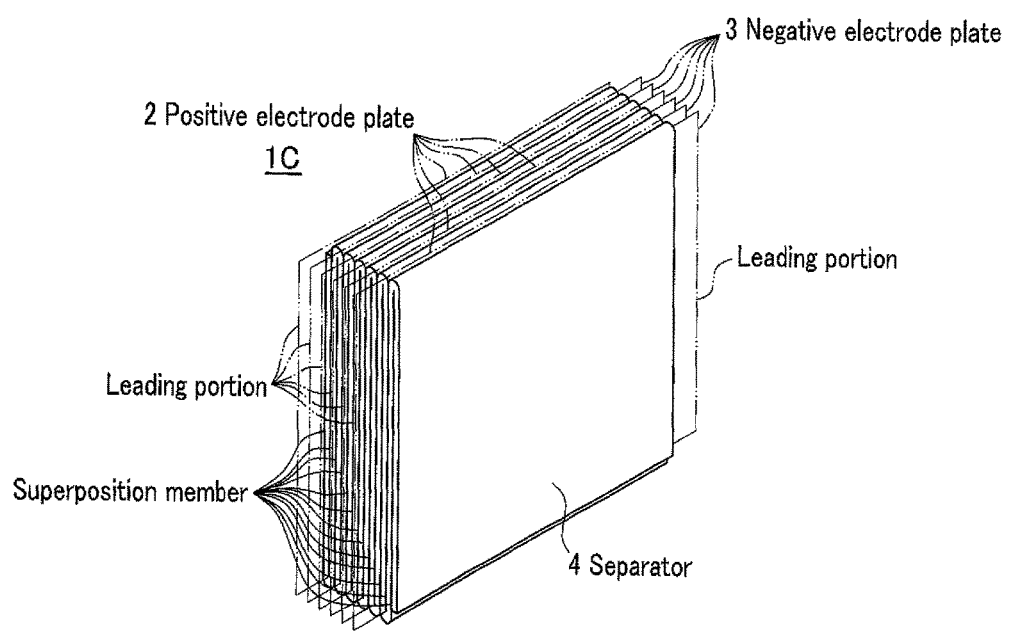
FIG. 3 is a perspective view illustrating an internal structure (electrode plate groups) of a rectangular lithium ion secondary battery disclosed in Patent Document 1.
Figure 4A:
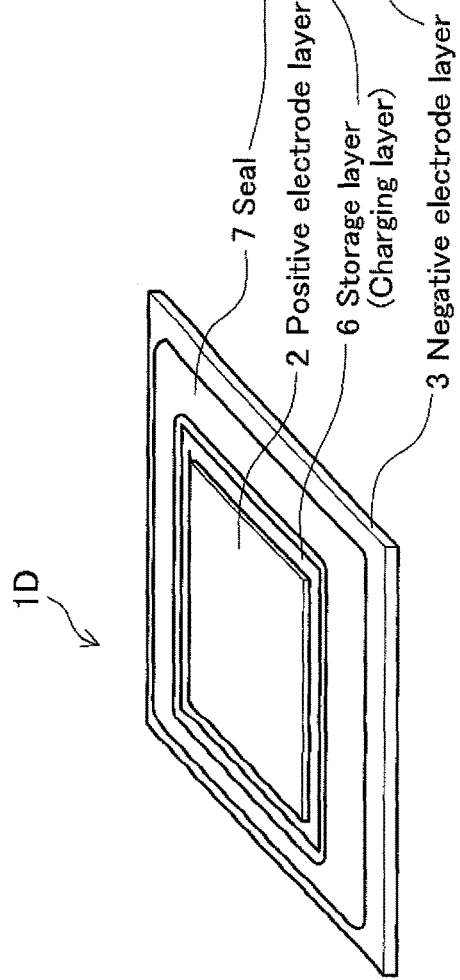
FIG. 4 is a perspective view and a sectional view illustrating a structure of an all-solid-state secondary cell.

The quantum cell is an all-solid-state secondary cell. FIG. 4 illustrates a structure capable of solely functioning as a secondary cell. That is, the quantum cell 1D has a charging layer 6 between a negative electrode layer 3 and a positive electrode layer 2.

The charging layer 6 is a layer to store electrons with a charging operation, to release the charged electrons with a discharging operation, and to keep the electrons (perform storage of electricity) in a state without charging/discharging. The charging layer 6 is formed by applying a photoexcited structural change technology.

The photoexcited structural change is described, for example, in International Patent Application Laid-open No. WO/2008/053561 and is a phenomenon (technology) found by Akira Nakazawa, who is an inventor of the above application as well as the present application. That is, Akira Nakazawa found out that, when effective excitation energy is applied to an insulation-coated translucent metal oxide which is a semiconductor having a band gap at a predetermined value or higher, a number of energy levels with no electron are generated in the band gap. The quantum cell is charged by being caused to capture electrons in these energy levels and discharged by being caused to release the captured electrons.

The charging layer 6 is formed in a way where insulation-coated n-type metal oxide semiconductor particles adhere to the negative electrode layer 3 in a thin film shape and is transformed to be capable of storing electrons with a photoexcited structural change caused at the n-type metal oxide semiconductor by ultraviolet irradiation.

In the quantum cell, the positive electrode layer 2 includes an electrode main body layer and a p-type metal oxide semiconductor layer formed to be in contact with the charging layer 6. The p-type metal oxide semiconductor layer is arranged so that electrons are prevented from being injected from the electrode main body layer to the charging layer 6. The negative electrode layer 3 and the electrode main body layer of the positive electrode layer 2 are simply required to be formed as conductive layers.

A secondary battery of each embodiment described in the following is formed by using one or a plurality of units (hereinafter, called single-layer quantum cells) each solely functioning as a quantum cell illustrated in FIG. 4. The respective embodiments commonly adopt a technical idea that a single-layer quantum cell is used as being folded in two or four. Therefore, the single-layer quantum cell is formed to have a length in the folding direction being twice or approximately just over twice of a length required in the folding direction. The shape thereof is preferably rectangular but is not limited to a rectangle. It is also possible to have another shape such as a circle, an ellipse, and a hexagon. For the folding in two, it is preferable to have a line-symmetric shape so that an upper shape and a lower shape are completely superposed. However, it is not limited thereto. In embodiments of folding in four described later, four portions after being folded in four are partially superposed. However, it is also possible to be completely superposed.

For example, the positive electrode layer 2 and the negative electrode layer 3 of the single-layer quantum cell may have a thickness approximately in a range between 10 nm and 1 μm and the charging layer 6 may have a thickness approximately in a range between 50 nm and 10 μm. Thus, the single-layer quantum cell is a sheet-shaped cell as being capable of being folded in two or four. Here, the charging layer 6 is an all-solid layer but not a layer in which particles are packed. Accordingly, damages and cracking are prevented from occurring at bent sections.

As described above with reference to FIG. 4, the seal 7 is not necessarily required to be arranged in the single-layer quantum cell as well. As long as an unnecessary short-circuit such as a short-circuit between the negative electrode layer 3 and the positive electrode layer 2 can be prevented with a gap and the like after being folded, the seal 7 can be eliminated.

(B) First Embodiment

Figure 7:
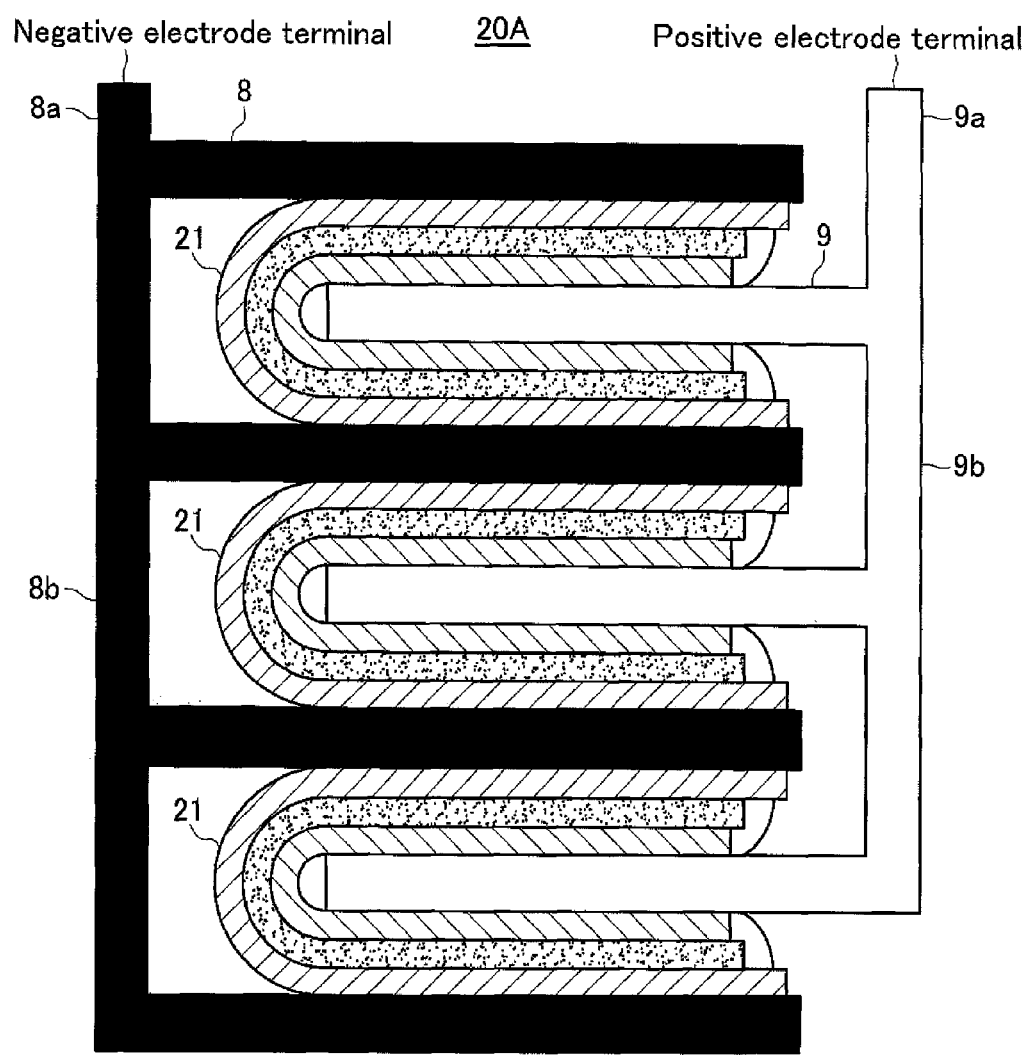
FIG. 7 is a sectional view illustrating a structure of a secondary battery of a first embodiment.

Next, a first embodiment of a secondary battery according to the present invention will be described with reference to the drawings. FIG. 7 is a sectional view illustrating a structure of a secondary battery 20A according to the first embodiment as viewing from the same direction as FIG. 4(B). In FIG. 7, dimensions in the thickness direction are more emphasized than those in the planar direction.

The secondary battery 20A according to the first embodiment includes one or a plurality (FIG. 7 illustrates an example of three) of single-layer quantum cells (hereinafter, appropriately called a folded single-layer quantum cells) 21 which are folded in two. In the following, description is provided on a structure and effects in a case of adopting a plurality of the folded single-layer quantum cells 21. There exist some of the structure to be directly adopted and some of the effects even in a case of adopting only one folded single-layer quantum cell 21. Each folded single-layer quantum cell 21 is folded with the positive electrode layer 2 being at the inner side. The number of the folded single-layer quantum cells 21 may be determined in accordance with desired current capacity.

A positive electrode terminal plate 9 is inserted to a space between an upper part and a lower part of the positive electrode layer 2 mutually faced due to folding in two of the single-layer quantum cell until the leading end thereof is contacted to the inner face of the bent section. The positive electrode terminal plates 9 arranged as the number of the folded single-layer quantum cells 21 are mutually connected by a positive electrode terminal connection portion 9b. The folded single-layer quantum cell 21 is inserted between the negative electrode terminal plates 8 which are adjacent one above the other. All of the negative electrode terminal plates 8 are mutually connected by a negative electrode terminal connection portion 8b. Here, it is also possible to eliminate some of the negative electrode terminal plates 8 illustrated in FIG. 7. For example, in FIG. 7, it is possible to eliminate the negative electrode terminal plate 8 located at the uppermost position and the negative electrode terminal plate 8 located at the lowermost position.

Here, being called "plates", the negative electrode terminal plates 8 and the positive electrode terminal plates 9 may be formed in a thin film shape as well as a thin plate shape. Further, not being required that the entire face thereof contributes to electrical connection, the negative electrode terminal plates 8 and the positive electrode terminal plates 9 may be formed in a mesh shape, a comb shape, or the like in which a conductive section is partially eliminated. Further, the length in the insertion direction may be shorter than the length for having the leading end thereof to be contacted to the inner face of the bent section.

The negative electrode terminal connection portion 8b and the positive electrode terminal connection portion 9b include extension portions 8a, 9a respectively for exposing the negative electrode terminal and the positive electrode terminal to the outside of a mounting member (not illustrated). In FIG. 7, the negative electrode terminal connection portion 8b and the positive electrode terminal connection portion 9b are arranged at lateral sides. However, the negative electrode terminal connection portion 8b and the positive electrode terminal connection portion 9b may be located in an arbitrary manner. For example, it is also possible that the negative electrode terminal connection portion 8b and the positive electrode terminal connection portion 9b are arranged at the near side and the far side in the normal direction of the depiction of the drawing. Alternatively, it is also possible that the negative electrode terminal connection portion 8b is arranged at the left side and the positive electrode terminal connection portion 9b is arranged at the near side in the normal direction of the depiction of the drawing. Further, the negative electrode terminal connection portion 8b and the positive electrode terminal connection portion 9b may be plate-shaped or rod-shaped. Further, not limited to a single member, a plurality of members therefor may be aligned in the normal direction of the depiction of the drawing.

Further, in FIG. 7, the negative electrode terminal plates 8, the extension portion 8a, and the negative electrode terminal connection portion 8b are integrally formed, while the positive electrode terminal plates 9, the extension portion 9a, and the positive electrode terminal connection portion 9b are integrally formed. However, it is not required to be formed integrally from the beginning. For example, it is also possible that the negative electrode terminal plates 8, the extension portion 8a, and the negative electrode terminal connection portion 8b are structured as separate members and connected in a manufacturing process.

As long as the negative electrode terminal plates 8, the extension portion 8a, and the negative electrode terminal connection portion 8*b* can be connected to the negative electrode layer 3 and the external negative electrode terminal (not illustrated) as having a sufficiently-low electrical resistance value, shapes and materials thereof are not limited. Similarly, as long as the positive electrode terminal plates 9, the extension portion 9*a*, and the positive electrode terminal connection portion 9*b* can be connected to the positive electrode layer 2 and the external positive electrode terminal (not illustrated) as having a sufficiently-low electrical resistance value, shapes and materials thereof are not limited.

Since the secondary battery 20A according to the first embodiment adopts a plurality of the folded single-layer quantum cells 21 in parallel connection, current capacity can be increased.

Further, although the secondary battery 20A according to the first embodiment adopts a multilayer structure in parallel connection, an insulation layer (see FIG. 6) for ensuring insulation between the positive electrode and the negative electrode is not required to be arranged and whole volume thereof can be reduced.

Figure 6:
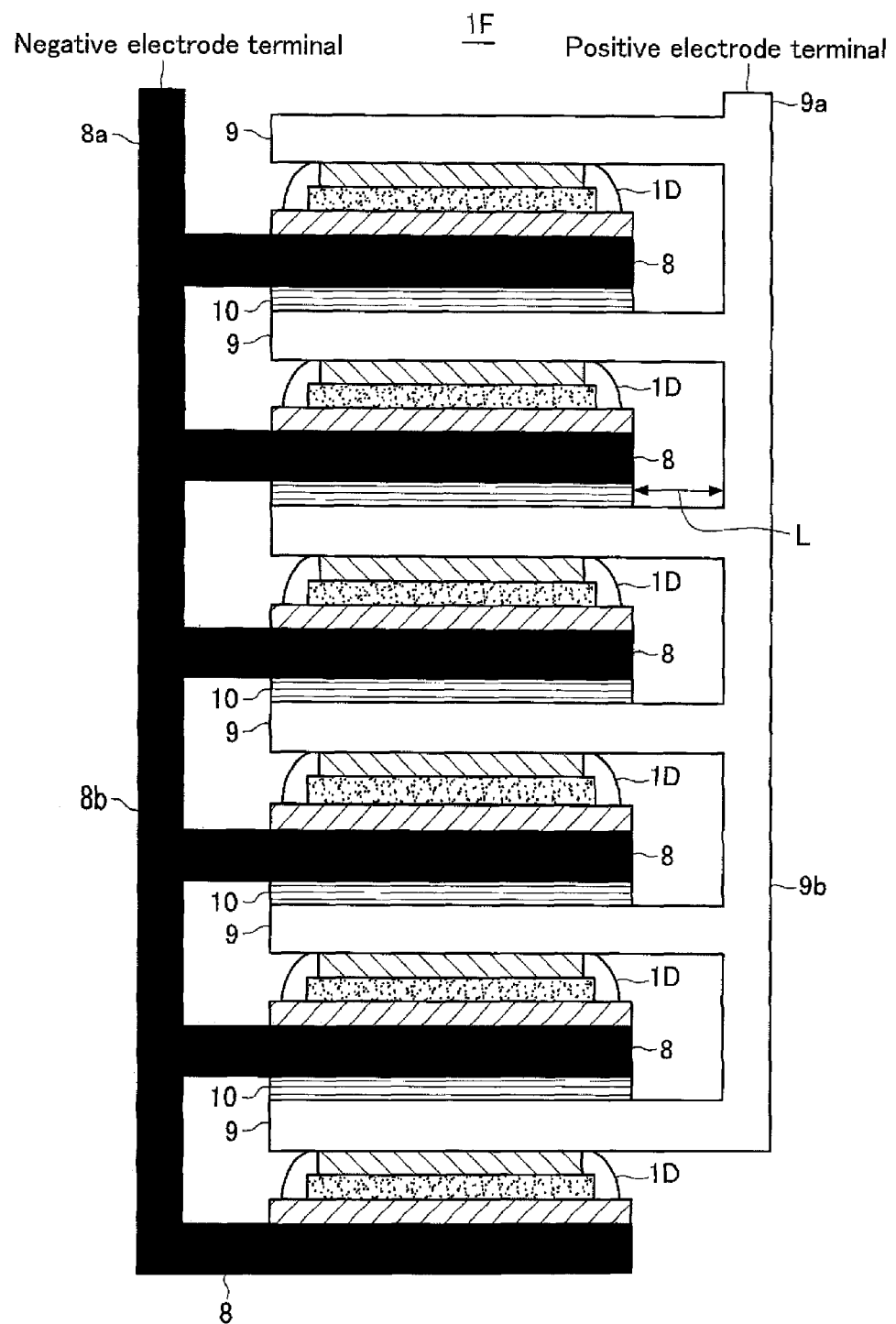
FIG. 6 is a sectional view illustrating an anticipatable structure of a secondary battery in which a plurality of single-layer cells are parallel-connected with each single-layer cell being an all-solid-state secondary cell.

Further, since the single-layer quantum cell is used in a state of being folded in two, area occupied by the secondary battery 20A can be reduced. For example, compared to a case that the single-layer quantum cell has similar area to that of the secondary battery 1F illustrated in FIG. 6, area occupied by the secondary battery 20A can be reduced approximately to half of the secondary battery 1F.

Further, since the single-layer quantum cell is used in a state of being folded in two, a component count of members to be layered can be reduced and workload of layering processes can be reduced. For example, even when the secondary battery 20A is formed to have approximately the same thickness as that of the secondary battery 1F illustrated in FIG. 6, the required number of the folded single-layer quantum cells 21 is reduced to half of the required number of the single-layer cells in the secondary battery 1F.

Further, the secondary battery 20A can be manufactured after forming the folded single-layer quantum cells 21 while selecting the single-layer quantum cells formed into small pieces. Accordingly, it is possible to manufacture the large-capacity secondary battery 20A as adopting non-defective single-layer quantum cells.

Furthermore, since the positive electrode terminal plate 9 is inserted until the leading end thereof is contacted to the inner face of the bent section of the folded single-layer quantum cell 21, positional variation of the folded single-layer quantum cell 21 can be eliminated and short-circuits and the like can be prevented.

In FIG. 7, the folded single-layer quantum cell 21 is folded in two with the positive electrode layer 2 being at the inner side. However, it is also possible to adopt, as a modified embodiment of the secondary battery 20A of the first embodiment, a structure having a folded single-layer quantum cell which is folded in two with the negative electrode layer 3 being at the inner side. The modified embodiment corresponds to a structure that positive electrode elements in FIG. 7 are replaced with negative electrode elements and negative electrode elements in FIG. 7 are replaced with positive electrode elements.

A plurality of the secondary batteries 20A illustrated in FIG. 7 may be mounted in a single mounting member. In this case, the extension portions 8*a*, 9*a* of the plurality of secondary batteries 20A may be connected in series, connected in parallel, or connected in series-parallel. Alternatively, the extension portions 8*a*, 9*a* may be separately exposed to the outside. For example, two of the secondary batteries 20A may be mounted in amounting member so that the planar shape thereof is approximately circular, while the planar shape of each folded single-layer quantum cell 21 is semicircular.

(C) Second Embodiment

Figure 8:
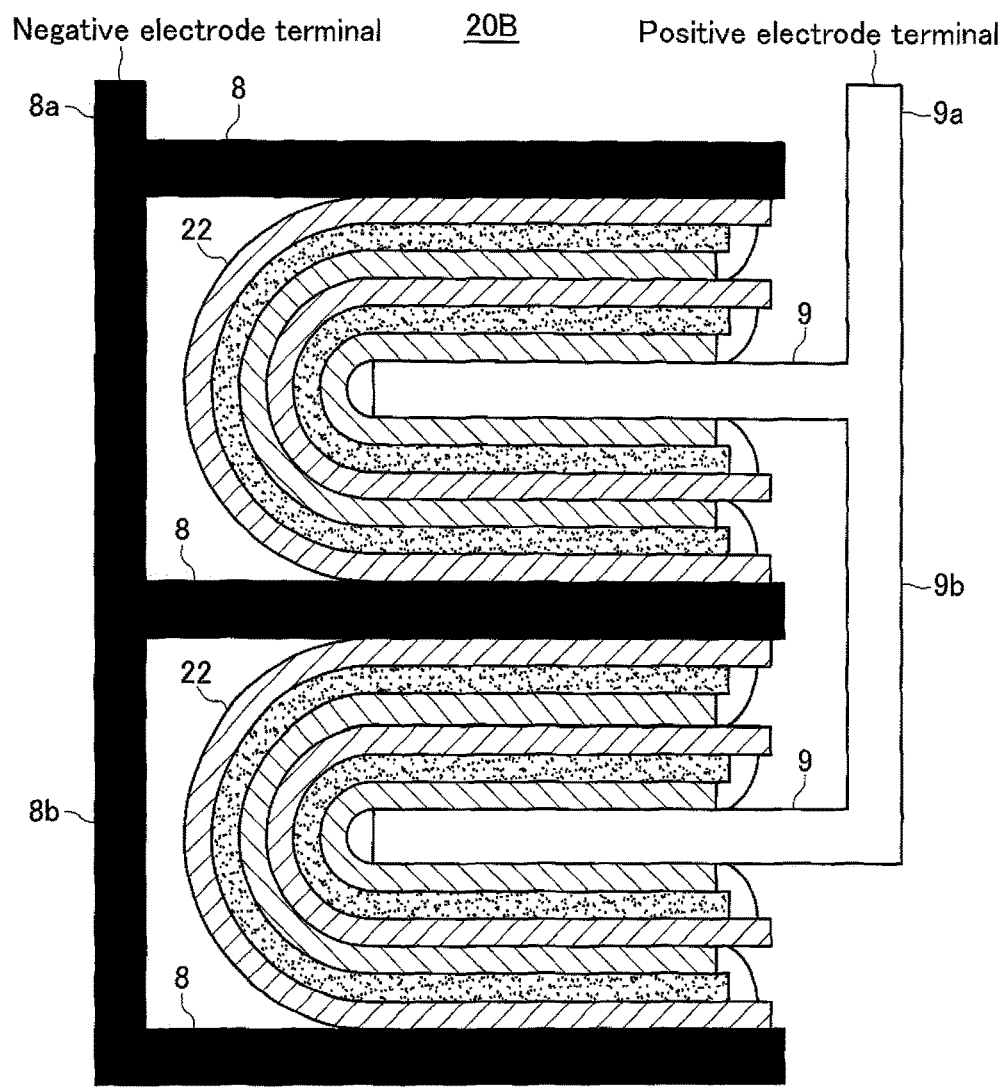
FIG. 8 is a sectional view illustrating a structure of a secondary battery of a second embodiment.

Next, a second embodiment of a secondary battery according to the present invention will be described with reference to the drawings. FIG. 8 is a sectional view illustrating a structure of a secondary battery 203 according to the second embodiment as viewing from the same direction as FIG. 4(B). In FIG. 8, dimensions in the thickness direction are more emphasized than those in the planar direction.

The secondary battery 20B according to the second embodiment has one or a plurality (FIG. 8 illustrates an example of two) of cell structures (hereinafter, appropriately called a folded multistage single-layer quantum cells) 22. In each of the cell structures, single-layer quantum cells are superposed into two stages (the number of stages may be three or more in serial connection) and folded in two in the two-stage superposed state. In the following, description is provided on a structure and effects in a case of adopting a plurality of the folded multistage single-layer quantum cells 22. There exist some of the structure to be directly adopted and some of the effects even in a case of adopting only one folded multistage single-layer quantum cell 22. Each folded multistage single-layer quantum cell 22 is folded with the positive electrode layer 2 of the upper-stage single-layer quantum cell being at the inner side. The number of the folded multistage single-layer quantum cells 22 may be determined in accordance with desired current capacity. Further, the number of stages of the single-layer quantum cell before being folded may be determined in accordance with desired terminal voltage.

A positive electrode terminal plate 9 is inserted to a space between an upper part and a lower part of the positive electrode layer 2 mutually faced due to folding until the leading end thereof is contacted to the inner face of the bent section. The positive electrode terminal plates 9 arranged as the number of the folded multistage single-layer quantum cells 22 are mutually connected by the positive electrode terminal connection portion 9*b*. The folded multistage single-layer quantum cell 22 is inserted between the negative electrode terminal plates 8 which are adjacent one above the other. Here, it is also possible to eliminate the negative electrode terminal plate 8 located at the uppermost position and the negative electrode terminal plate 8 located at the lowermost position. All of the negative electrode terminal plates 8 are mutually connected by the negative electrode terminal connection portion 8*b*. The negative electrode terminal connection portion 8*b* and the positive electrode terminal connection portion 9*b* include the extension portions 8*a*, 9*a* respectively for exposing the negative electrode terminal and the positive electrode terminal to the outside of a mounting member (not illustrated).

In the secondary battery 20B according to the second embodiment, since the folded multistage single-layer quantum cell 22 is formed by serial-connecting the single-layer quantum cells, terminal voltage can be heightened. Further, since a plurality of the folded multistage single-layer quantum cells 22 are parallel-connected, current capacity can be increased.

Further, similarly to the first embodiment, the secondary battery 20B according to the second embodiment produces effects such as reducing whole volume without requiring insulation layers (see FIG. 6), reducing occupied area as folding in two, reducing workload of layering processes as reducing a component count of members to be layered, manufacturing the secondary battery as adopting non-defective single-layer quantum cells while selecting the single-layer quantum cells formed into small pieces, and suppressing positional variation of the folded multistage single-layer quantum cell 22.

As long as being capable of being applied to the secondary battery 20B of the second embodiment, the modified embodiments appropriately described for the secondary battery 20A of the first embodiment become to modified embodiments of the secondary battery 20B of the second embodiment. Here, detailed description thereof will not be repeated.

(D) Third Embodiment

Figure 9:
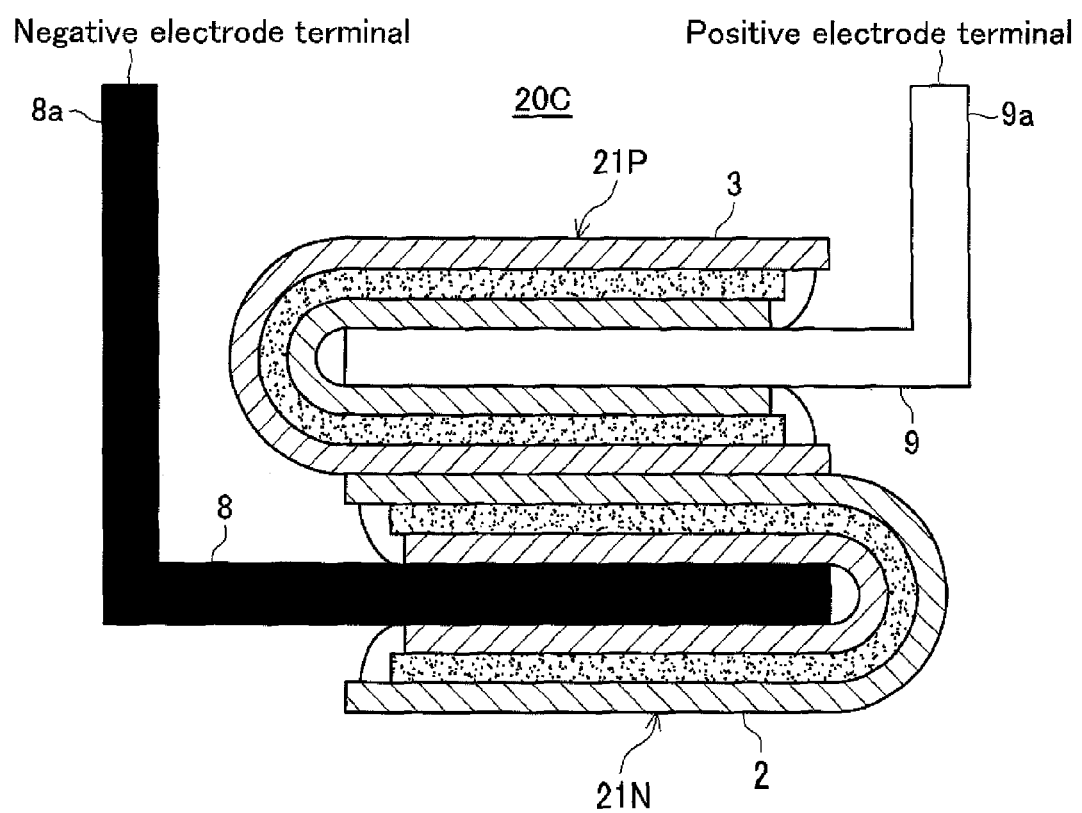
FIG. 9 is a sectional view illustrating a structure of a secondary battery of a third embodiment.

Next, a third embodiment of a secondary battery according to the present invention will be described with reference to the drawings. FIG. 9 is a sectional view illustrating a structure of a secondary battery 20C according to the third embodiment as viewing from the same direction as FIG. 4(B). In FIG. 9, dimensions in the thickness direction are more emphasized than those in the planer direction.

In the secondary battery 20C according to the third embodiment, a single-layer quantum cell 21P which is folded in two with the positive electrode layer 2 being at the inner side (hereinafter, appropriately called a first folded single-layer quantum cell) and a single-layer quantum cell 21N which is folded in two with the negative electrode layer 3 being at the inner side (hereinafter, appropriately called as a second folded single-layer quantum cell) are layered so that the respective bent sections are located in opposite directions. In an example of FIG. 9, a lower face being a face of the negative electrode layer 3 of the first folded single-layer quantum cell 21P is in face-contact with an upper face being a face of the positive electrode layer 3 of the second folded single-layer quantum call 21N.

The positive electrode terminal plate 9 is inserted to a space between an upper part and a lower part of the positive electrode layer 2 of the first folded single-layer quantum cell 21P mutually faced due to folding until the leading end thereof is contacted to the inner face of the bent section. The negative electrode terminal plate 8 is inserted to a space between an upper part and a lower part of the negative electrode layer 3 of the second folded single-layer quantum cell 21N mutually faced due to folding until the leading end thereof is contacted to the inner face of the bent section. The negative electrode terminal plate 8 and the positive electrode terminal plate 9 are connected to the extension portions 8*a*, 9*a* respectively for exposing the negative electrode terminal and the positive electrode terminal to the outside of a mounting member (not illustrated).

The secondary battery 20C according to the third embodiment has a structure that electrons can be directly transferred between the negative electrode layer 3 of the first folded single-layer quantum cell 21P and the positive electrode layer 2 of the second folded single-layer quantum cell 21N, so that the two single-layer quantum cells are serial-connected. Accordingly, in the secondary battery 20C of the third embodiment, terminal voltage can be heightened.

Further, similarly to the first embodiment, the secondary battery 20C according to the third embodiment produces effects such as reducing occupied area as folding in two, reducing workload of layering processes as reducing a component count of members to be layered, manufacturing the secondary battery as adopting non-defective single-layer quantum cells while selecting the single-layer quantum cells formed into small pieces, and suppressing positional variation of the first folded single-layer quantum cell 21P and the second folded single-layer quantum cell 21N.

In FIG. 9, each of the first folded single-layer quantum cell 21P and the second folded single-layer quantum cell 21N is formed by folding one (single-stage) single-layer quantum cell. Here, at least one of the first folded single-layer quantum cell 21P and the second folded single-layer quantum cell 21N may be the folded multistage single-layer quantum cell described for the second embodiment.

As long as being capable of being applied to the secondary battery 20C of the third embodiment, the modified embodiments appropriately described for the secondary batteries 20A, 20B of the abovementioned embodiments become to modified embodiments of the secondary battery 20C of the third embodiment. Here, detailed description thereof will not be repeated.

(E) Fourth Embodiment

Figure 10:
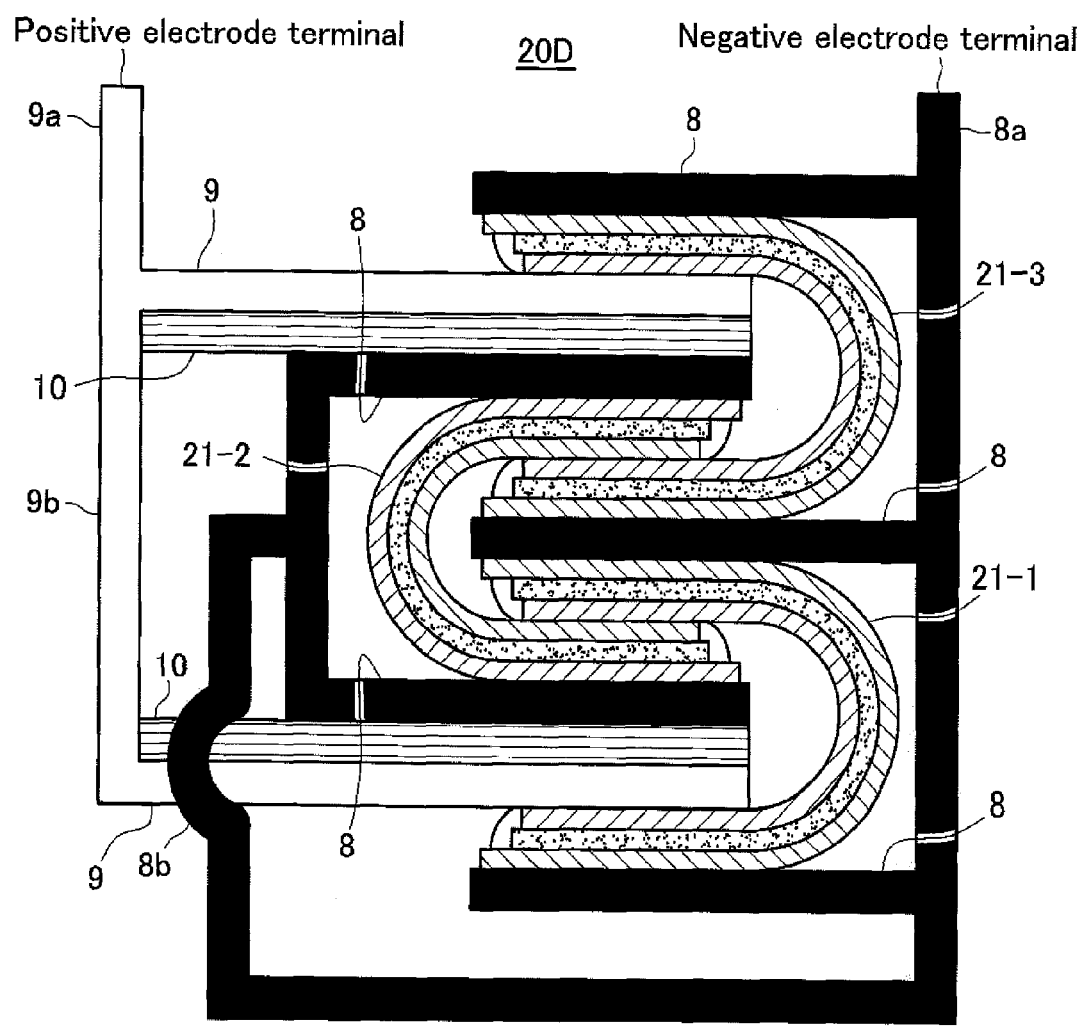
FIG. 10 is a sectional view illustrating a structure of a secondary battery of a fourth embodiment.

Next, a fourth embodiment of a secondary battery according to the present invention will be described with reference to the drawings. FIG. 10 is a sectional view illustrating a structure of a secondary battery 20D according to the fourth embodiment as viewing from the same direction as FIG. 4(B). In FIG. 10, dimensions in the thickness direction are more emphasized than those in the planar direction.

The secondary battery 20D according to the fourth embodiment is formed by layering a plurality (FIG. 10 illustrates an example of three) of the folded single-layer quantum cells 21 each folded in two with the positive electrode layer 2 being at the inner side, while at least one of an upper folded portion and a lower folded portion of each folded single-layer quantum cell 21 is inserted to a folding internal gap of another folded single-layer quantum cell. Here, a bent section of the odd-numbered folded single-layer quantum cell 21 from the lower side and a bent section of the odd-numbered folded single-layer quantum cell 21 are located oppositely in the lateral direction so that at least one of the upper folded portion and the lower folded portion can be inserted to the folding internal gap of another folded single-layer quantum cell. In the example of FIG. 10, bent sections of the first and third folded single-layer quantum cells 21-1, 21-3 are located at the right side and a bent section of the second folded single-layer quantum cell 21-2 is located at the left side. Here, the upper folded portion of the first folded single-layer quantum cell 21-1 is inserted to the internal gap of the second folded single-layer quantum cell 21-2 and the lower folded portion of the second folded single-layer quantum cell 21-2 is inserted to the internal gap of the first folded single-layer quantum cell 21-1. Further, the upper folded portion of the second folded single-layer quantum cell 21-2 is inserted to the internal gap of the third folded single-layer quantum cell 21-3 and the lower folded portion of the third folded single-layer quantum cell 21-3 is inserted to the internal gap of the second folded single-layer quantum cell 21-2.

An exposed face of each folded single-layer quantum cell 21 is a face of the negative electrode layer 3. Each folded single-layer quantum cell 21 is sandwiched between two negative electrode terminal plates 8. At an area where the negative electrode layers 3 are adjacent due to layering like the first and third folded single-layer quantum cells 21-1, 21-3, a common negative electrode terminal plate 8 is adopted as the upper negative electrode terminal plate 8 for the lower folded single-layer quantum cell 21-1 and the lower negative electrode terminal plate 8 for the upper folded single-layer quantum cell 21-3. Here, it is also possible to eliminate some of the negative electrode terminal plates (see FIG. 11 described later).

The upper folded portion and the lower folded portion of the adjacent folding single-layer quantum cells 21 are inserted to the internal gap as being embedded thereto (in other words, the upper folded portion and the lower folded portion of the adjacent folded single-layer quantum cells 21 are fitted together), the positive electrode terminal plate 9 to which an insulation layer 10 is attached is inserted to an area where the positive electrode layer 2 and the negative electrode layer 3 of the folded single-layer quantum cells 21 are mutually faced at the other side. The insulation layer 10 is arranged at the side to be in contact with the negative electrode layer 3.

The positive electrode terminal plates 9 are mutually connected by the positive electrode terminal connection portion 9b. The negative electrode terminal plates 8 are mutually connected by the negative electrode terminal connection portion 8b. The negative electrode terminal connection portion 8b and the positive electrode terminal connection portion 9b include the extension portions 8a, 9a respectively for exposing the negative electrode terminal and the positive electrode terminal to the outside of a mounting member (not illustrated).

In the three folded single-layer quantum cells 21, parallel connection at the negative electrode layer 3 side is actualized by connecting the negative electrode layer 3 to the negative electrode terminal plate 9, while parallel connection is actualized at the positive electrode layer 2 side by mutually connecting the positive electrode layers 2. Thus, the three folded single-layer quantum cells 21 are parallel-connected.

Figure 11:
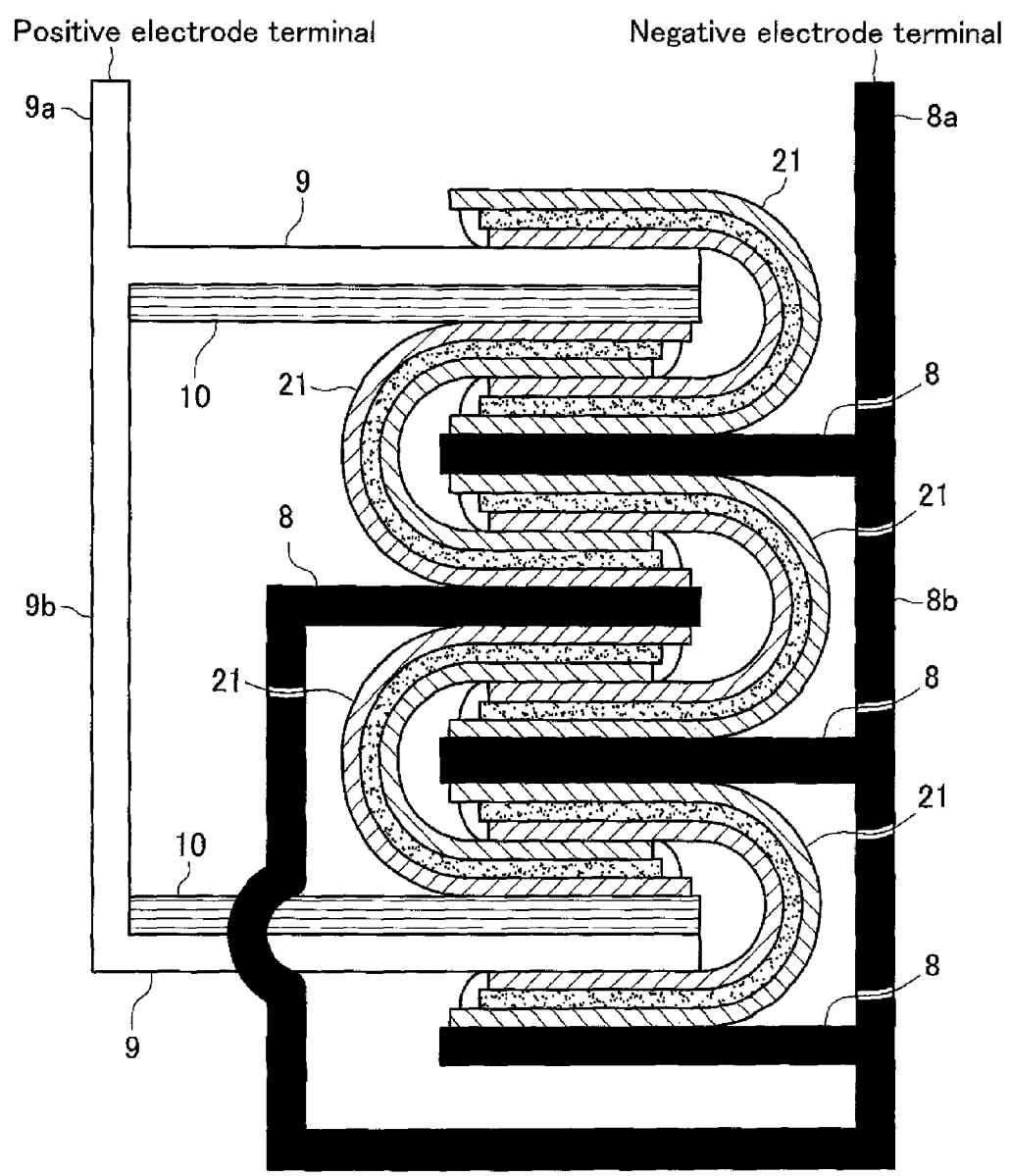
FIG. 11 is a sectional view illustrating a structure of a secondary battery of a modified embodiment of the fourth embodiment.

The secondary battery 20D illustrated in FIG. 10 includes three of the folded single-layer quantum cells 21 each folded in two with the positive electrode layer 2 being at the inner side. FIG. 11 illustrates a secondary battery including five folded single-layer quantum cells 21 each folded in two with the positive electrode layer 2 being at the inner side. The technical idea thereof is the same as that of the secondary battery illustrated in FIG. 10. Here, as described above, some of the negative electrode terminal plates 8 which can be eliminated is eliminated from the secondary battery illustrated in FIG. 11.

In the secondary battery 203 (including the secondary battery illustrated in FIG. 11) according to the fourth embodiment, since a plurality of the folded single-layer quantum cells 21 are parallel-connected, current capacity can be increased.

Further, the secondary battery 20D (including the secondary battery illustrated in FIG. 11) according to the fourth embodiment also produces effects such as reducing whole volume as suppressing the number of the insulation layers, reducing occupied area as folding in two, reducing workload of layering processes as reducing a component count of members to be layered, manufacturing the secondary battery as adopting non-defective single-layer quantum cells while selecting the single-layer quantum cells formed into small pieces, and suppressing positional variation of the folded single-layer quantum cell 21.

As long as being capable of being applied to the secondary battery 20D of the fourth embodiment, the modified embodiments appropriately described for the secondary batteries 20A to 20C of the abovementioned embodiments become to modified embodiments of the secondary battery 20D of the fourth embodiment. Here, detailed description thereof will not be repeated.

(F) Fifth Embodiment

Figure 12:
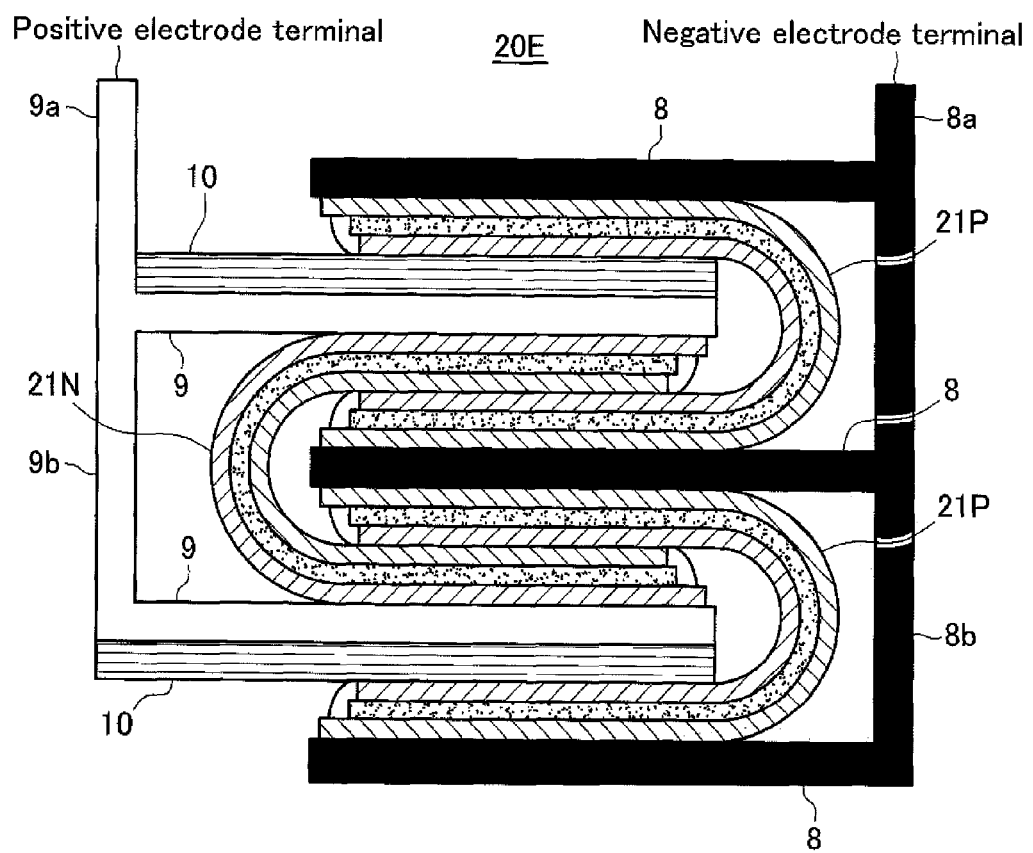
FIG. 12 is a sectional view illustrating a structure of a secondary battery of a fifth embodiment.

Next, a fifth embodiment of a secondary battery according to the present invention will be described with reference to the drawings. FIG. 12 is a sectional view illustrating a structure of a secondary battery 20E according to the fifth embodiment as viewing from the same direction as FIG. 4(B). In FIG. 12, dimensions in the thickness direction are more emphasized than those in the planar direction.

The secondary battery 20E according to the fifth embodiment is formed by layering a plurality (FIG. 12 illustrates an example of three) of the folded single-layer quantum cells 21P, 21N, while at least one of an upper folded portion and a lower folded portion of each of the folded single-layer quantum cells 21P, 21N is inserted to a folding internal gap of another folded single-layer quantum cell. Here, the first folded single-layer quantum cell 21P is folded in two with the positive electrode layer 2 being at the inner side and the second folded single-layer quantum cell 21N is folded in two with the negative electrode layer 3 being at the inner side. In the secondary battery 20E illustrated in FIG. 12, the first and third cells from the lower side are the first folded single-layer quantum cells 21P and the second cell is the second folded single-layer quantum cell 21N.

Each of the two first folded single-layer quantum cells 21P is sandwiched between two negative electrode terminal plates 8. Here, a common negative electrode terminal plate 8 is adopted as the upper negative electrode terminal plate 8 for the lower first folded single-layer quantum cell and the lower negative electrode terminal plate 8 for the upper first folded single-layer quantum cell 21P. The common negative electrode terminal plate 8 may be eliminated. The second folded single-layer quantum cell 21N is sandwiched between two positive electrode terminal plates 9 each having the insulation layer 10. The insulation layer 10 is arranged at the side to be in contact with the positive electrode layer 2 of the first folded single-layer quantum cell 21P.

The positive electrode terminal plates 9 are mutually connected by the positive electrode terminal connection portion 9b. The negative electrode terminal plates 8 are mutually connected by the negative electrode terminal connection portion 8b. The negative electrode terminal connection portion 8b and the positive electrode terminal connection portion 9b include the extension portions 8a, 9a respectively for exposing the negative electrode terminal and the positive electrode terminal to the outside of a mounting member (not illustrated).

Here, relation in connection is evaluated as assuming that the first folded single-layer quantum cells 21P and the second folded single-layer quantum cell 21N are unfolded. In this unfolded structure, the two first folded single-layer quantum cells 21P are placed, with the negative electrode layer 3 located at the lower side, on the negative electrode terminal plate 8. The second folded single-layer quantum cell 21N is placed, with the negative electrode layer 3 located at the lower side, on the two first folded single-layer quantum cells 21P. Further, the positive electrode terminal plate 9 is placed on the second folded single-layer quantum cell 21N. That is, in the above structure, one single-layer quantum cell (the second folded single-layer quantum cell 21N) is serial-connected to a parallel circuit of two single-layer quantum cells (the first folded single-layer quantum cells 21P).

In the secondary battery 20E according to the fifth embodiment, since the first folded single-layer quantum cells 21P and the second folded single-layer quantum cell 21N are serial-connected, terminal voltage can be heightened. In the case of FIG. 12, current capacity can be increased due to parallel connection.

Further, the secondary battery 20E according to the fifth embodiment also produces effects such as reducing whole volume as suppressing the number of the insulation layers, reducing occupied area as folding in two, reducing workload of layering processes as reducing a component count of members to be layered, manufacturing the secondary battery as adopting non-defective single-layer quantum cells while selecting the single-layer quantum cells formed into small pieces, and suppressing positional variation of the folded single-layer quantum cells 21P, 21N.

As long as being capable of being applied to the secondary battery 20E of the fifth embodiment, the modified embodiments appropriately described for the secondary batteries 20A to 20D of the abovementioned embodiments become to modified embodiments of the secondary battery 20E of the fifth embodiment. Here, detailed description thereof will not be repeated.

(G) Sixth Embodiment

Figure 13A:
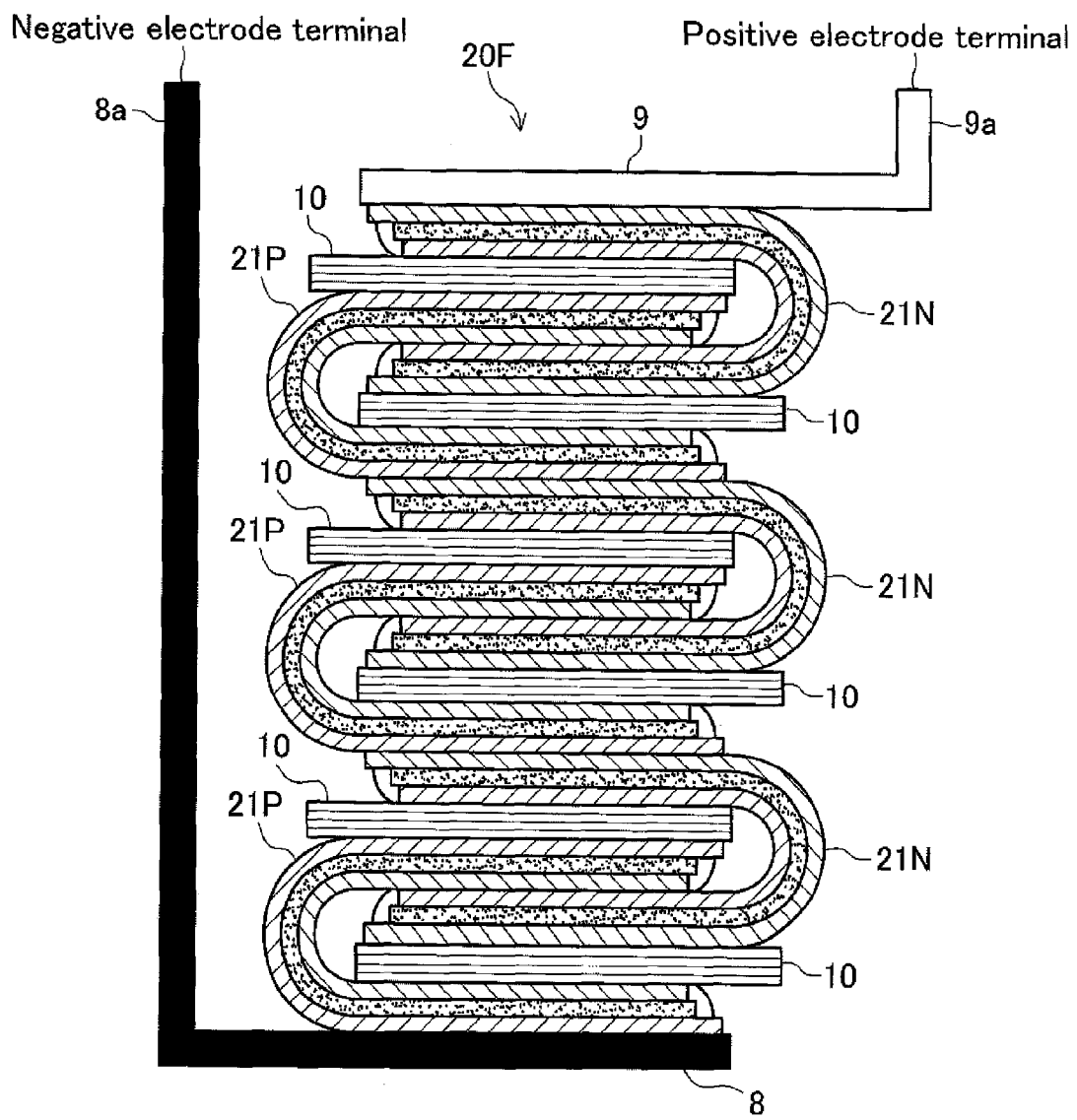
FIG. 13 is a sectional view illustrating a structure of a secondary battery of a sixth embodiment and a serial-connection unit structure being a structural element thereof.
Figure 13B:
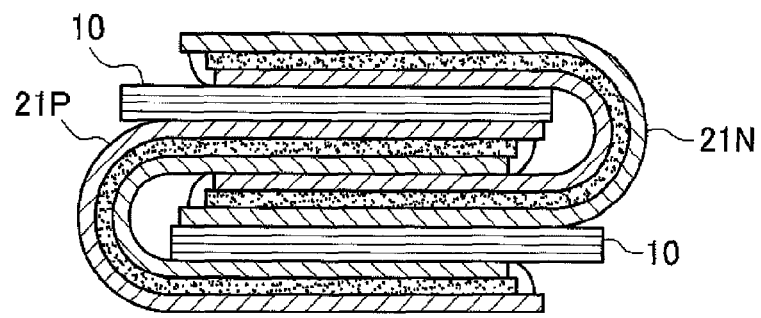

Next, a sixth embodiment of a secondary battery according to the present invention will be described with reference to the drawings. FIG. 13(A) is a sectional view illustrating a structure of a secondary battery 20F according to the sixth embodiment as viewing from the same direction as FIG. 4(B). In FIG. 13(A), dimensions in the thickness direction are more emphasized than those in the planar direction. FIG. 13(B) is a sectional view illustrating a serial-connection unit structure of the secondary battery 20F according to the sixth embodiment.

The secondary battery 20F according to the sixth embodiment is formed of a serial-connected unit structure illustrated in FIG. 13(B) or formed by layering a plurality (FIG. 13(B) illustrates an example of three) of the serial-connected unit structures as being in contact with each other without interposing an insulation layer. The positive electrode terminal plate 9 is in contact with the outward-exposed positive electrode layer 2 of the uppermost stage. The positive electrode terminal plate 9 is in contact with the extension portion 9a for exposing the positive electrode terminal to the outside of a mounting member (not illustrated). The negative electrode terminal plate 8 is in contact with the exposed negative electrode layer 3 of the lowermost stage. The negative electrode terminal plate 8 is in contact with the extension portion 8a for exposing the negative electrode terminal to the outside of the mounting member (not illustrated).

In the serial-connected unit structure illustrated in FIG. 13(B), the first folded single-layer quantum cell 21P folded in two with the positive electrode layer 2 being at the inner side is located at the lower side and the second folded single-layer quantum cell 21N folded in two with the negative electrode layer 3 being at the inner side is located at the upper side. Then, the folded single-layer quantum cells 21P, 21N are layered so that the respective bent sections are located oppositely in a mutually embedded state (mutually fitted state). The positive electrode layer 2 of a lower folded portion of the first folded single-layer quantum cell 21P and the positive electrode layer 2 of a lower folded portion of the second folded single-layer quantum cell 21N are insulated as being in contact respectively to opposite faces of the common insulation layer 10 at the lower side. Further, the negative electrode layer 3 of an upper folded portion of the first folded single-layer quantum cell 21P and the negative electrode layer 3 of an upper folded portion of the second folded single-layer quantum cell 21N are insulated as being in contact respectively to opposite faces of the common insulation layer 10 at the upper side.

Assuming that the second folded single-layer quantum cell 21N and the first folded single-layer quantum cell 21P which structure the serial-connected unit structure illustrated in FIG. 13(B) are developed, the developed first folded single-layer quantum cell 21P is in contact with the developed second folded single-layer quantum cell 21N with a half area thereof superposed thereon. That is, the serial-connected unit structure illustrated in FIG. 13(B) is a structure in serial connection between the second folded single-layer quantum cell 21N and the first folded single-layer quantum cell 21P.

In the example of the secondary battery 20F according to the sixth embodiment illustrated in FIG. 13(A), since the serial-connected unit structure illustrated in FIG. 13(B) is layered into three stages, six of the folded single-layer quantum cells 21N, 21P are serial-connected.

In the secondary battery 20F according to the sixth embodiment, since a plurality of the single-layer quantum cells are serial-connected, terminal voltage can be heightened.

Further, similarly to the first embodiment, the secondary battery 20P according to the sixth embodiment produces effects such as reducing occupied area as folding in two, reducing workload of layering processes as reducing a component count of members to be layered, manufacturing the secondary battery as adopting non-defective single-layer quantum cells while selecting the single-layer quantum cells formed into small pieces, and suppressing positional variation of the first folded single-layer quantum cell 21P and the second folded single-layer quantum cell 21N.

As long as being capable of being applied to the secondary battery 20F of the sixth embodiment, the modified embodiments appropriately described for the secondary batteries 20A to 20E of the abovementioned embodiments become to modified embodiments of the secondary battery 20F of the sixth embodiment. Here, detailed description thereof will not be repeated.

Figure 14:
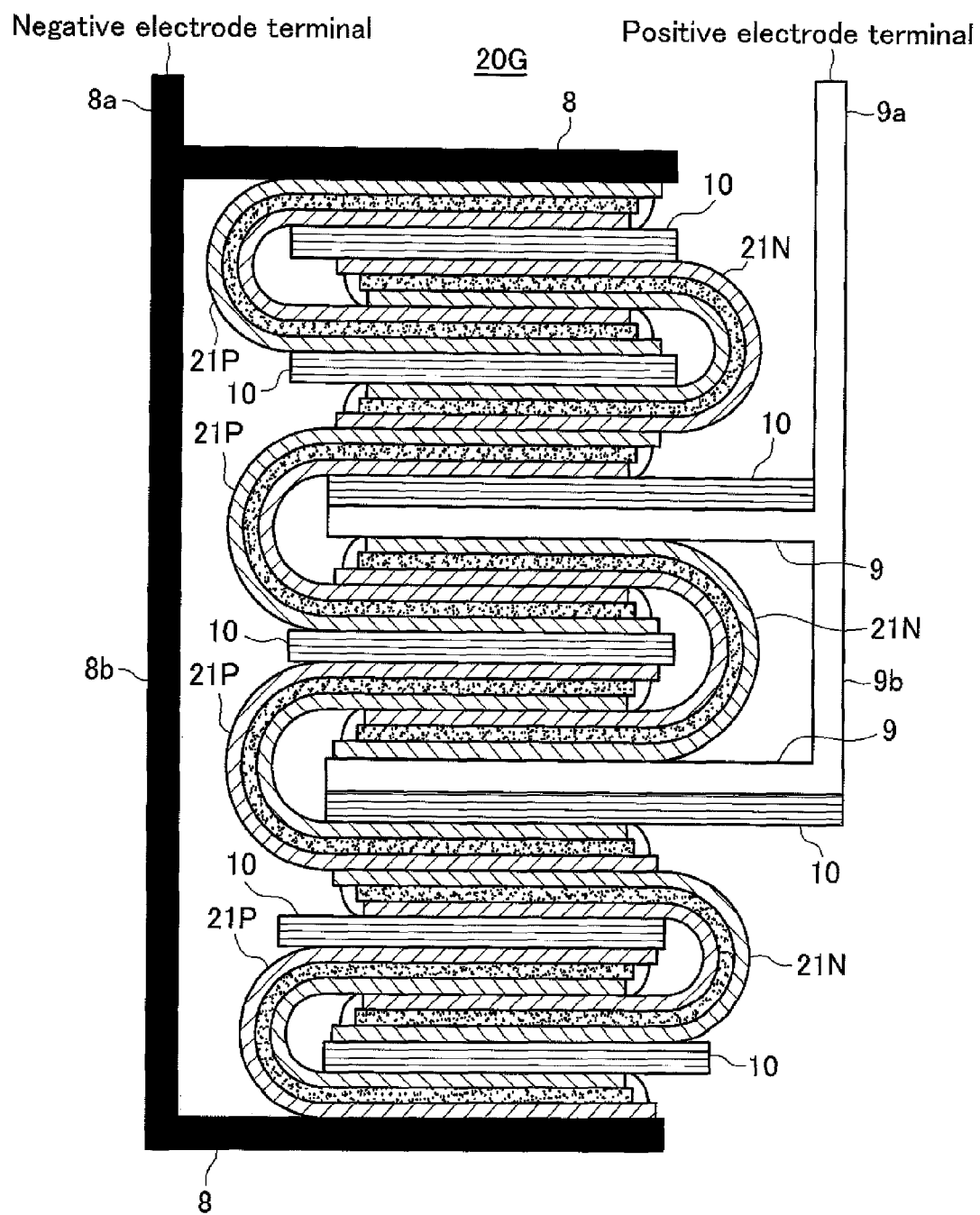
FIG. 14 is a sectional view illustrating a structure of a secondary battery of a modified embodiment in which technical ideas of the fifth and sixth embodiments are combined.

FIG. 14 is a sectional view illustrating a secondary battery 20G obtained by combining the technical idea of the secondary battery 20E of the fifth embodiment and the technical idea of the secondary battery 20F of the sixth embodiment. In the secondary battery 20G of the modified embodiment, the serial-connected unit structure illustrated in FIG. 13(B) is flipped upside down and placed on the first folded single-layer quantum cell 21P at the upper side of the secondary battery 20E of the fifth embodiment, and then, the negative electrode terminal plate 8 at the upper side is contacted thereto. Further, the serial-connected unit structure illustrated in FIG. 13(B) is arranged under the first folded single-layer quantum cell 21P at the lower side of the secondary battery 20E of the fifth embodiment, and then, the negative electrode terminal plate 8 at the lower side is contacted thereto.

Thus, in the secondary battery 20G, one single-layer quantum cell 21N is serial-connected to a circuit in which two serial-connected circuits each including three single-layer quantum cells (21P, 21N, 21P from the lower side) are parallel-connected.

(H) Seventh Embodiment

Figure 15:
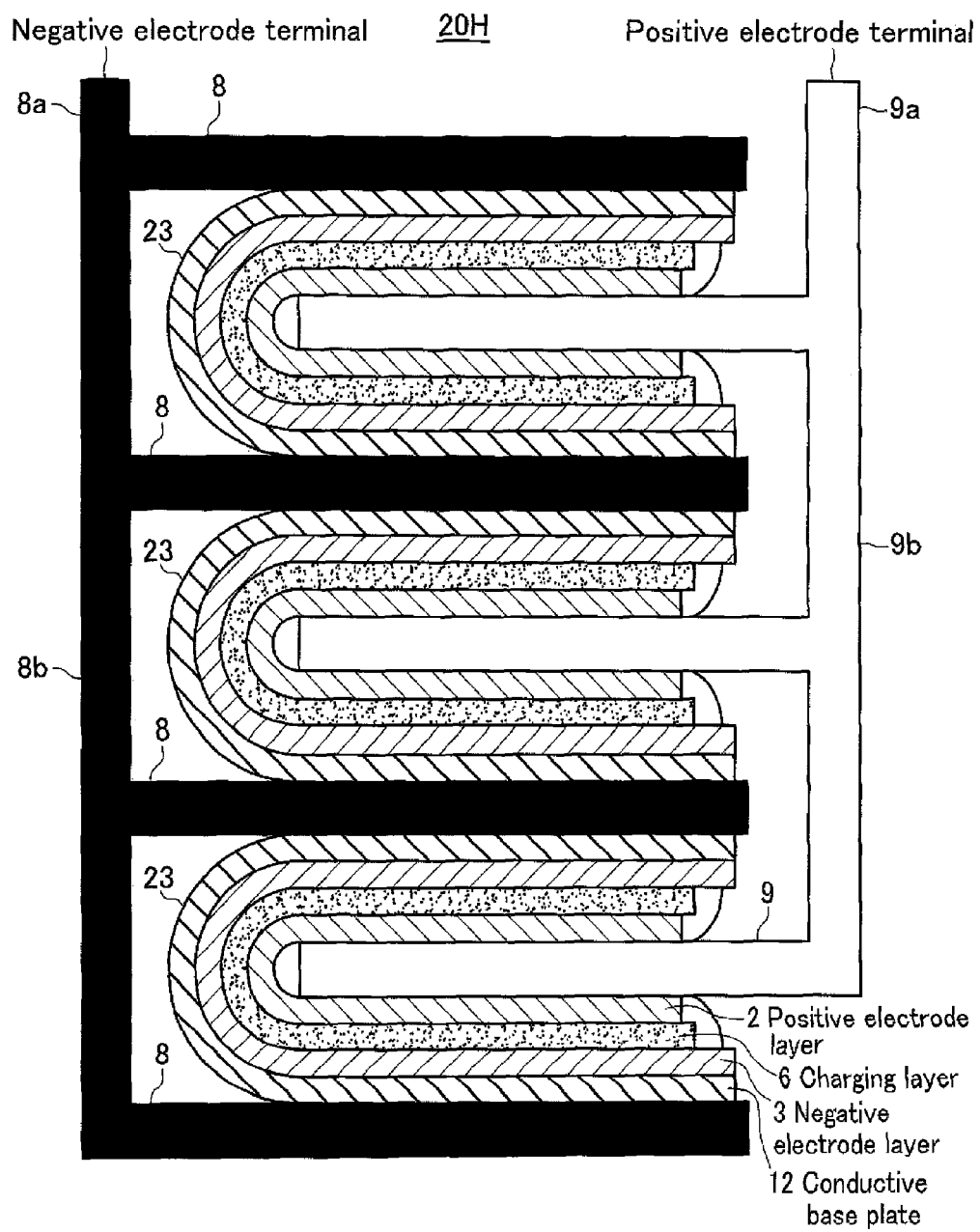
FIG. 15 is a sectional view illustrating a structure of a secondary battery of the seventh embodiment.

Next, a seventh embodiment of a secondary battery according to the present invention will be described with reference to the drawings. FIG. 15 is a sectional view illustrating a structure of a secondary battery 20H according to the seventh embodiment as viewing from the same direction as FIG. 4(B). In FIG. 15, dimensions in the thickness direction are more emphasized than those in the planar direction.

Each of the first to sixth embodiments described above adopts the folded single-layer quantum cell formed by folding the single-layer quantum cell (see FIG. 4) which includes the negative electrode layer 3, the charging layer 6, and the positive electrode layer 2. Here, the seal 7 is not an essential structural element. The single-layer quantum cell including the negative electrode layer 3, the charging layer 6, and the positive electrode layer 2 is formed on a base plate through a thin-film forming process, and then, separated from the base plate. Alternatively, the single-layer quantum cell is formed by being cut into a predetermined shape after being separated. For such a quantum cell, a thin conductive base plate formed of conductive material such as copper and stainless steel can be adopted as the abovementioned base plate as well as an insulation base plate.

The secondary battery 20H of the seventh embodiment is obtained by modifying a part of the secondary battery 20A (see FIG. 7) of the first embodiment. In the secondary battery 20H, a folded base-plate-included single-layer quantum cell 23 obtained by folding a unit structure (hereinafter, appropriately called a base-plate-included single-layer quantum cell) with the positive electrode layer 2 being at the inner side is adopted instead of the folded single-layer quantum cell 21 of the secondary battery 20A of the first embodiment. Here, the unit structure denotes a structure that the negative electrode layer 3, the charging layer 6, and the positive electrode layer 2 are layered on a conductive base plate 12 and the seal 7 (not being an essential structural element) is arranged for short-circuit prevention. The rest of the structure is the same as the secondary battery 20A of the first embodiment.

According to the secondary battery 20H of the seventh embodiment, since the unit structure before being folded is the base-plate-included single-layer quantum cell, it is possible to eliminate a manufacturing process to separate a cell structural portion from the base plate. The rest of effects is the same as the first embodiment.

Since the folded base-plate-included single-layer quantum cell 23 includes the conductive base plate 12, the negative electrode layer 3 can be eliminated by causing the conductive base plate 12 to serve as the negative electrode layer 3 as well.

As long as being capable of adopting the technical idea of the secondary battery 20H of the seventh embodiment, the modified embodiments appropriately described for the secondary batteries 20A to 20F of the abovementioned embodiments become to modified embodiments of the secondary battery 20H of the seventh embodiment. Here, detailed description will not be repeated.

In the secondary battery 20H of the seventh embodiment, the folded single-layer quantum cell 21 of the secondary battery 20A of the first embodiment is replaced with the folded base-plate-included single-layer quantum cell 23. It is also possible to actualize a secondary battery (not illustrated) in which the single-layer quantum cell of the folded single-layer quantum cell 21, 21P in each of the secondary batteries 20B to 20F of the second to sixth embodiments is replaced with the folded base-plate-included single-layer quantum cell 23.

In the secondary battery 20H illustrated in FIG. 15, the conductive base plate 12 is arranged at the negative electrode layer 3 side. Similarly, in a case that the conductive base plate 12 is arranged at the positive electrode layer 2 side, it is also possible to structure a secondary battery with the conductive base plate 12 remained.

(I) Eighth Embodiment

Figure 16A:
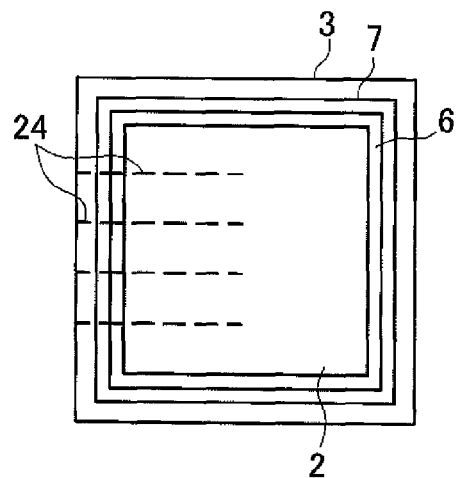
FIG. 16 is an explanatory view illustrating a structure of a secondary battery of an eighth embodiment adopting a first example of a tongue-piece-included folded single-layer quantum cell.
Figure 16B:
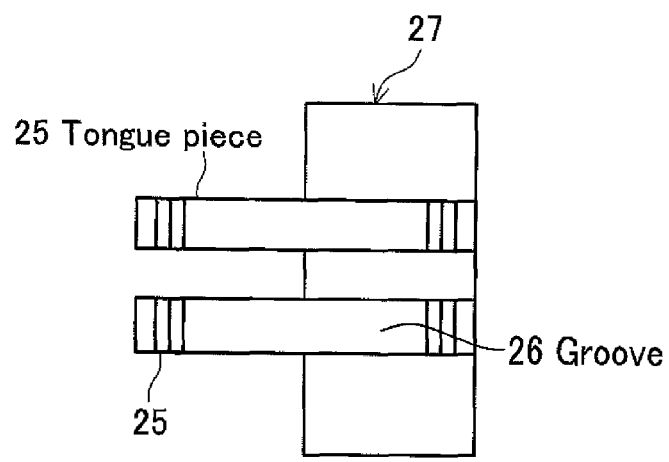
Figure 16C:
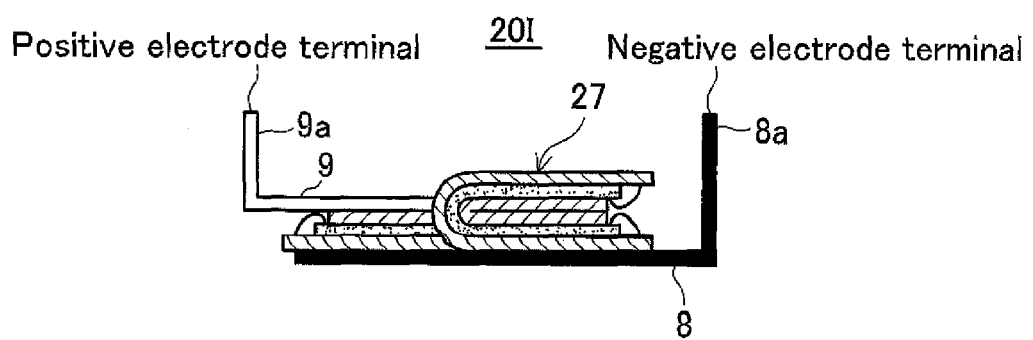

Next, an eighth embodiment of a secondary battery according to the present invention will be described with reference to the drawings. FIG. 16(C) is a front view illustrating a structure of a secondary battery 20I according to the eighth embodiment as viewing from the same direction as the sectional view of FIG. 4(B). In this front view, the seal 7 at the near side to be naturally seen is eliminated. In FIG. 16(C), dimensions in the thickness direction are more emphasized than those in the planar direction.

The secondary battery 20I according to the eighth embodiment is formed as follows, for example. First, as illustrated in a plane view of FIG. 16(A), one or a plurality of slits 24 extending to the vicinity of a line at which the folding is performed are formed at a single-layer quantum cell (FIG. 16(A) illustrates an example of four slits). The slits 24 may be formed by cutting a completed single-layer quantum cell. Alternatively, the slits 24 may be formed, during a forming process of a single-layer quantum cell due to sequential forming of thin films, by disturbing film forming at regions where the slits 24 are to be formed. Next, as illustrated in a front view of FIG. 16(B), predetermined sections among sections separated by the slits 24 are folded with the positive electrode layer 2 being at the inner side. FIG. 16(B) illustrates an example of folding the far-most section, a section between the second and third slits 24 from the far side, and the near-most section. Sections which are not folded form tongue pieces 25 extended from a folded body when viewed as a whole after the folding. Extension sections from the tongue pieces 25 form grooves 26 in the folded body. Hereinafter, a folded single-layer quantum cell 27 having the tongue pieces 25 as illustrated in FIG. 16(B) are appropriately called a tongue-piece-included folded single-layer quantum cell.

In the following embodiments, even in a case that the tongue pieces and the grooves are not illustrated in the drawing used for description, there may be a case that references 25, 26 are used in the description.

Figure 17A:
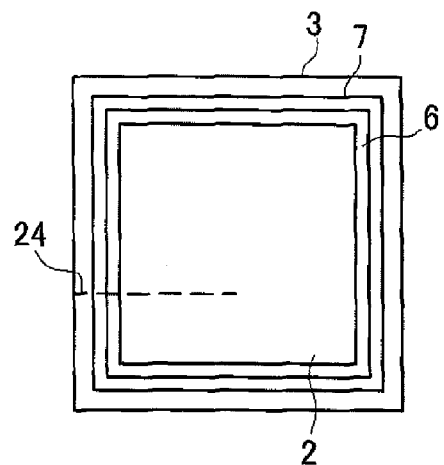
FIG. 17 is an explanatory view illustrating a structure of a second example of the tongue-piece-included folded single-layer quantum cell.
Figure 17B:
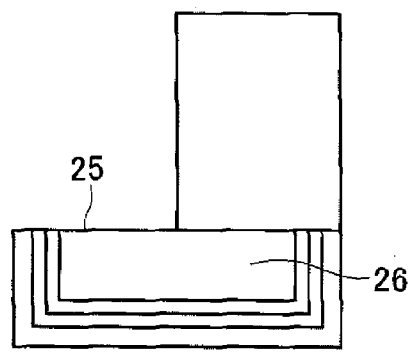
Figure 18A:
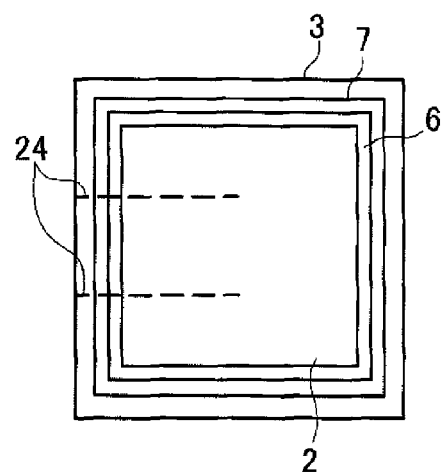
FIG. 18 is an explanatory view illustrating a structure of a third example of the tongue-piece-included folded single-layer quantum cell.
Figure 18B:
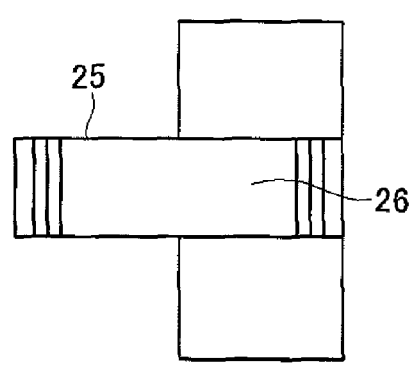

FIG. 17(B) illustrates a tongue-piece-included folded single-layer quantum cell in which a single tongue piece 25 and a groove 26 at the extension thereof are arranged at the near side. FIG. 17(A) illustrates a state of the tongue-piece-included folded single-layer quantum cell before being folded. FIG. 18(B) illustrates a tongue-piece-included folded single-layer quantum cell in which a single tongue piece 25 and a groove 26 at the extension thereof are arranged at the center in the width direction. FIG. 18(A) illustrates a state of the tongue-piece-included folded single-layer quantum cell before being folded.

As illustrated in FIGS. 16 to 18, in the tongue-piece-included folded single-layer quantum cell 27, the number of the tongue pieces 25 and the position thereof are not limited. Further, width of the tongue piece 25 is not limited as well. Length of the tongue piece 25 is determined in accordance with length of the slit 24. However, the tongue piece 25 may be cut along a direction perpendicular to the longitudinal direction thereof after folding so as to be shorter than the length of the slit 24.

In the secondary battery 20I according to the eighth embodiment, the positive electrode terminal plate 9 is in contact at least with the positive electrode layer 2 at the tongue piece 25. Here, the positive electrode terminal plate 9 may be extended to be in contact with the positive electrode layer 2 which is exposed to the face of the groove 26. FIG. 16(C) illustrates such a case. The negative electrode terminal plate 8 is in contact at least with the negative electrode layer 3 at the lower side of the lower folded portion of the folded body. Here, the negative electrode terminal plate 8 may be extended to be in contact with the negative electrode layer 3 at the tongue piece 25. FIG. 16(C) illustrates such a case. Further, it is also possible to arrange another negative electrode terminal plate 8 which is to be in contact with the negative electrode layer 3 at the upper side of the upper folded portion of the folded body. The negative electrode terminal plate 8 and the positive electrode terminal plate 9 are connected respectively to the extension portions 8a, 9a for exposing the negative electrode terminal and the positive electrode terminal to the outside of a mounting member (not illustrated).

In FIG. 16, the tongue piece 25 is extended on the same plane as the lower folded portion of the folded body. It is also possible that the tongue piece 25 is folded at an angle other than 180 degrees against the lower folded portion of the folded body and the extending direction of the positive electrode terminal plate 9 is selected accordingly. Alternatively, it is also possible that the tongue piece 25 is bent at some midpoint and the leading end of the bent piece is contacted to the positive electrode terminal plate 9.

Figure 19A:
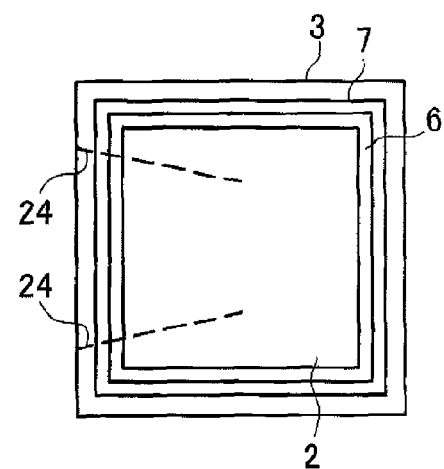
FIG. 19 is an explanatory view illustrating a structure of a fourth example of the tongue-piece-included folded single-layer quantum cell.
Figure 19B:
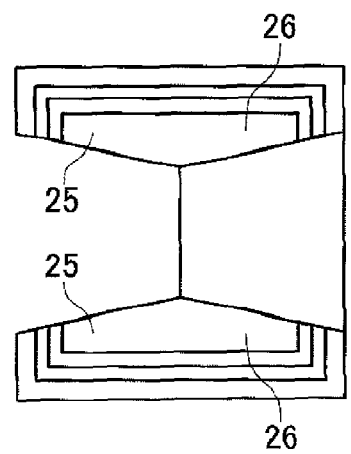

Further, FIG. 16 illustrates a case that the slits 24 intersect with a folding line as being perpendicular thereto. However, not limited to the above, the slits 24 and the folding line may mutually intersect at an angle other than 90 degrees, for example, as illustrated in FIG. 19.

Figure 20:
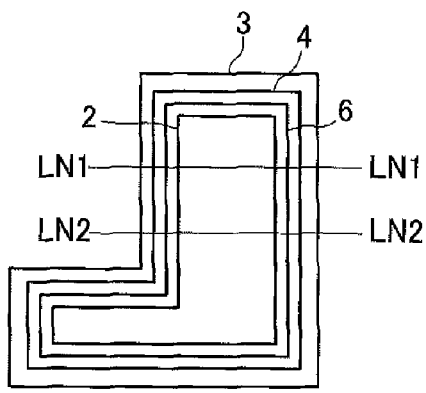
FIG. 20 is an explanatory view illustrating a structure of a fifth example of the tongue-piece-included folded single-layer quantum cell.

Further, FIG. 16 illustrates a case that the tongue-piece-included folded single-layer quantum cell 27 is formed by folding with the slits 24 formed. However, the tongue-piece-included folded single-layer quantum cell 27 may be formed in another way. For example, as illustrated in FIG. 20, the tongue-piece-included folded single-layer quantum cell 27 may be formed owing to that the single-layer quantum cell before being folded is shaped to have the tongue piece 25 and that portions other than the tongue piece 25 are folded along the folding line LN1 or LN2 being in parallel to the longitudinal direction of the tongue piece 25. Here, when forming is performed along the folding line LN1, a portion corresponding to the abovementioned groove 26 is formed. When forming is performed along the folding line LN2, the portion corresponding to the abovementioned groove 26 is not formed.

According to the secondary battery 20I of the eighth embodiment, since the tongue piece 26 is arranged, the positive electrode layer 2 can be also used as a structural element of a leading electrode and volume can be reduced by the electrode amount.

Effects of using the single-layer quantum cell which is folded are the same as described for the abovementioned embodiments.

As long as being capable of being applied to the secondary battery 20I of the eighth embodiment, the modified embodiments appropriately described for the secondary batteries 20A to 20J of the abovementioned embodiments become to modified embodiments of the secondary battery 20I of the eighth embodiment. Here, detailed description thereof will not be repeated.

(J) Ninth Embodiment

Figure 21:
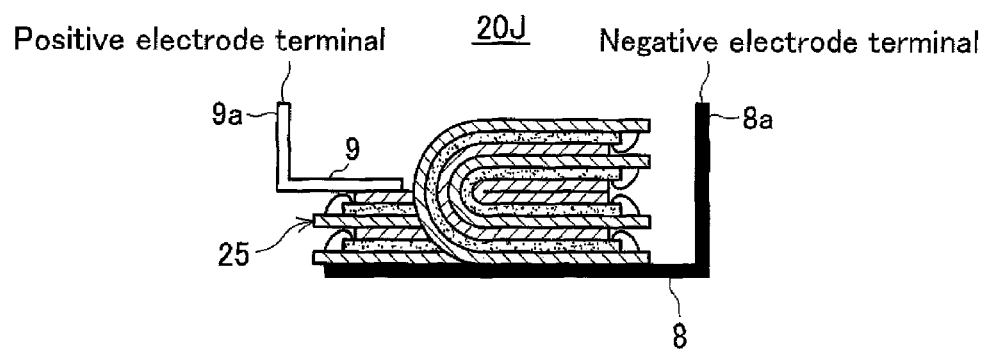
FIG. 21 is a front view illustrating a structure of a secondary battery of a ninth embodiment.

Next, a ninth embodiment of a secondary battery according to the present invention will be described with reference to the drawings. FIG. 21 is a front view illustrating a structure of a secondary battery 20J according to the ninth embodiment as viewing from the same direction as the sectional view of FIG. 4(B) and the front view of FIG. 16(C). In this front view, the seal 7 at the near side to be naturally seen is eliminated. In FIG. 21, dimensions in the thickness direction are more emphasized than those in the planar direction.

The secondary battery 20J according to the ninth embodiment has a cell structure in which the slits 24 (e.g., see FIG. 18(A)) are formed in a state that single-layer quantum cells are superposed into two stages and the single-layer quantum cells are folded in two with the positive electrode layer 2 of the upper-stage single-layer quantum cell being at the inner side as forming the tongue piece 25. The number of stages which corresponds to the number of serial connections may be three or more as well.

In the secondary battery 20J according to the ninth embodiment, the positive electrode terminal plate 9 is in contact at least with the positive electrode layer 2 of the uppermost-stage single-layer quantum cell at the tongue piece 25. The negative electrode terminal plate 8 is in contact at least with the lower-side negative electrode layer 3 of the lowermost-stage single-layer quantum cell of the lower folded portion of the folded body. The negative electrode terminal plate 8 and the positive electrode terminal plate 9 are connected respectively to the extension portions 8a, 9a for exposing the negative electrode terminal and the positive electrode terminal to the outside of a mounting member (not illustrated).

According to the secondary battery 20J of the ninth embodiment, since the single-layer quantum cells in a multistage manner with each orientation of upper and lower sides (top and bottom) aligned are folded, terminal voltage can be heightened owing to serial connection of the plurality of single-layer quantum cells. The rest of effects is the same as the secondary battery 20I according to the eighth embodiment.

As long as being capable of being applied to the secondary battery 20J of the ninth embodiment, the modified embodiments appropriately described for the secondary batteries 20A to 20I of the abovementioned embodiments become to modified embodiments of the secondary battery 20J of the ninth embodiment. Here, detailed description thereof will not be repeated.

(K) Tenth Embodiment

Figure 22:
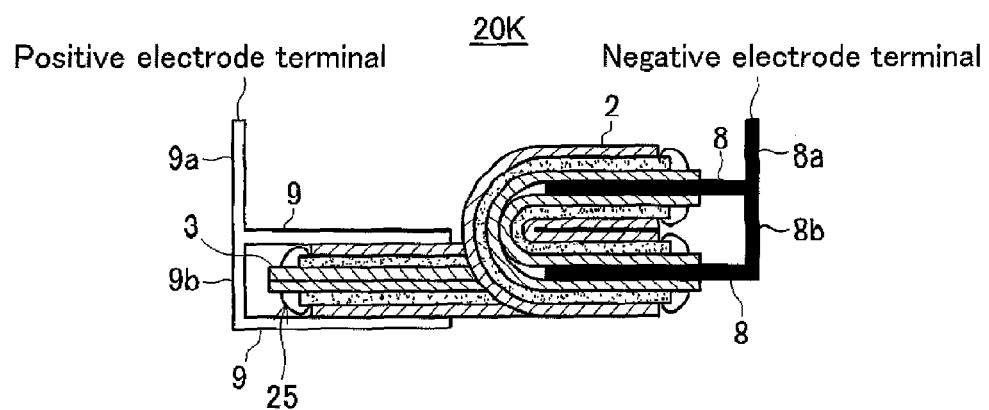
FIG. 22 is a front view illustrating a structure of a secondary battery of a tenth embodiment.

Next, a tenth embodiment of a secondary battery according to the present invention will be described with reference to the drawings. FIG. 22 is a front view illustrating a structure of a secondary battery 20K according to the tenth embodiment as viewing from the same direction as the sectional view of FIG. 4(B) and the front view of FIG. 16(C). In this front view, the seal 7 at the near side to be naturally seen is eliminated. In FIG. 22, dimensions in the thickness direction are more emphasized than those in the planar direction.

The secondary battery 20K according to the tenth embodiment has a cell structure described as follows. The slits 24 (e.g., see FIG. 18(A)) are formed in a state that two single-layer quantum cells are superposed into two sages as sandwiching the negative electrode terminal plates 8 with the positive electrode layer 2 of the lower-stage single-layer quantum cell located at the lower side and the positive electrode layer 2 of the upper-stage single-layer quantum cell located at the upper side. Then, the single-layer quantum cells are folded in two with the positive electrode layer 2 of the upper-stage single-layer quantum cell being at the inner side as forming the tongue piece 25.

In the secondary battery 20K according to the tenth embodiment, the two positive electrode terminal plates 9 are in contact at least with the positive electrode layers 2 of the upper-stage and lower-stage single-layer quantum cells at the tongue piece 25, respectively. The two positive electrode terminal plates 9 are mutually connected by the positive electrode terminal connection portion 9b. The positive electrode terminal connection portion 9b includes the extension portion 9a for exposing the positive electrode terminal to the outside of a mounting member (not illustrated). The negative electrode terminal plates 8 sandwiched between the two single-layer quantum cells are protruded outward from two upper and lower positions of the folded body due to folding. The negative electrode terminal plates 8 protruded from the two positions are mutually connected by the negative electrode terminal connection portion 8b. The negative electrode terminal connection portion 8b includes the extension portion 8a for exposing the negative electrode terminal to the outside of the mounting member (not illustrated).

According to the secondary battery 20K of the tenth embodiment, since the two single-layer quantum cells are in parallel connection, current capacity can be increased compared to a case with one single-layer quantum cell. The rest of effects is the same as the secondary battery 20I according to the eighth embodiment.

As long as being capable of being applied to the secondary battery 20K of the tenth embodiment, the modified embodiments appropriately described for the secondary batteries 20A to 20J of the abovementioned embodiments become to modified embodiments of the secondary battery 20K of the tenth embodiment. Here, detailed description thereof will not be repeated.

(L) Eleventh Embodiment

Figure 23:
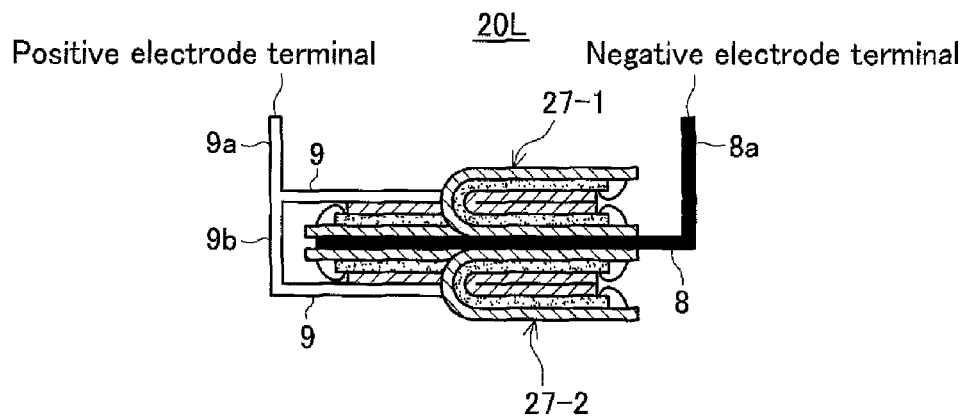
FIG. 23 is a front view illustrating a structure of a secondary battery of an eleventh embodiment.

Next, an eleventh embodiment of a secondary battery according to the present invention will be described with reference to the drawings. FIG. 23 is a front view illustrating a structure of a secondary battery 20L according to the eleventh embodiment as viewing from the same direction as the sectional view of FIG. 4(B) and the front view of FIG. 16(C). In this front view, the seal 7 at the near side to be naturally seen is eliminated. In FIG. 23, dimensions in the thickness direction are more emphasized than those in the planar direction.

The secondary battery 20L according to the eleventh embodiment includes two tongue-piece-included folded single-layer quantum cells illustrated in FIG. 16(C). The two tongue-piece-included folded single-layer quantum cells are located at different positions in the vertical direction while being located approximately at aligned positions in the lateral direction and the width direction. Here, in each tongue-piece-included folded single-layer quantum cell, the number of tongue pieces, positions of the tongue pieces in the width direction, and the like are not limited. It is preferable that the number of tongue pieces, positions of the tongue pieces in the width direction, and the like are matched in the two tongue-piece-included folded single-layer quantum cells. However, it is also possible that those are formed differently. Here, aligning of positions includes a symmetric case.

In the secondary battery 20L according to the eleventh embodiment, a tongue-piece-included folded single-layer quantum cell 27-1 is placed on the negative electrode terminal plate 8 so that the negative electrode layer 3 is contacted thereto. A tongue-piece-included folded single-layer quantum cell 27-2 vertically inverted from the tongue-piece-included folded single-layer quantum cell 27-1 is arranged under the negative electrode terminal plate 8 so that the negative electrode layer 2 is contacted to the lower side of the negative electrode terminal plate 8. The positive electrode terminal plates 9 are separately in contact at least with the positive electrode layers 2 of the tongue-piece-included folded single-layer quantum cells 27-1, 27-2 at the tongue pieces, respectively. The two positive electrode terminal plates 9 are mutually connected by the positive electrode terminal connection portion 9b. The positive electrode terminal connection portion 9b includes the extension portion 9a for exposing the positive electrode terminal to the outside of a mounting member not illustrated). The negative electrode terminal plate 8 with which the two tongue-piece-included folded single-layer quantum cells 27-1, 27-2 are commonly in contact includes the extension portion 8a for exposing the negative electrode terminal to the outside of the mounting member (not illustrated).

According to the secondary battery 20L of the eleventh embodiment, since the two tongue-piece-included folded single-layer quantum cells 27-1, 27-2 are in parallel connection, current capacity can be increased compared to a case with one tongue-piece-included folded single-layer quantum cell. The rest of effects is the same as the secondary battery 20I according to the eighth embodiment.

As long as being capable of being applied to the secondary battery 20L of the eleventh embodiment, the modified embodiments appropriately described for the secondary batteries 20A to 20K of the abovementioned embodiments become to modified embodiments of the secondary battery 20L of the eleventh embodiment. Here, detailed description thereof will not be repeated.

(M) Twelfth Embodiment

Figure 24A:
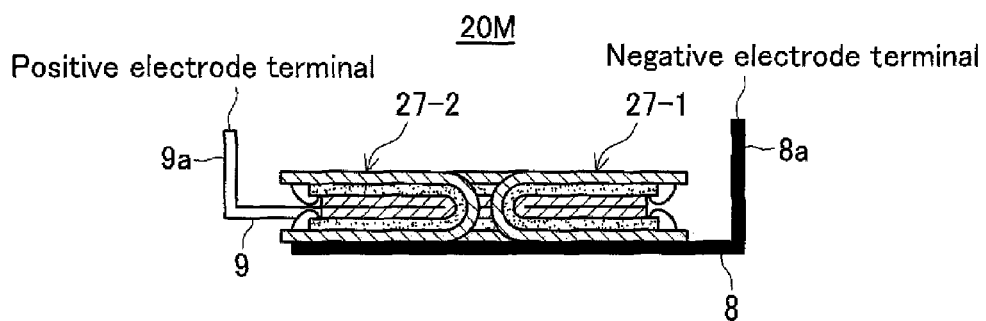
FIG. 24 is a front view and an exploded front view illustrating a structure of a secondary battery of a twelfth embodiment.
Figure 24B:
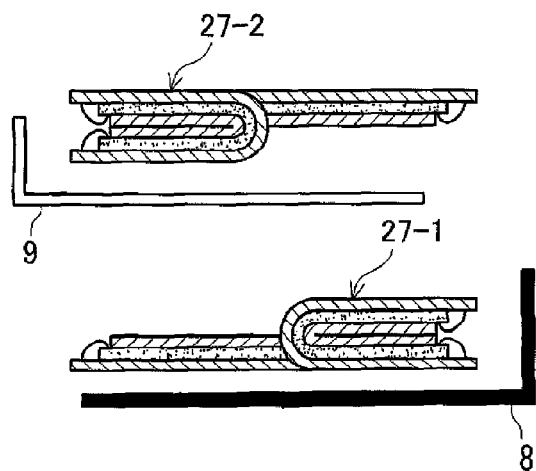

Next, a twelfth embodiment of a secondary battery according to the present invention will be described with reference to the drawings. FIG. 24(A) is a front view illustrating a structure of a secondary battery 20M according to the twelfth embodiment as viewing from the same direction as the sectional view of FIG. 4(B) and the front view of FIG. 16(C). In this front view, the seal 7 at the near side to be naturally seen is eliminated. FIG. 24(B) is a front view locating structural elements of the secondary battery 20M exploded in the vertical direction. In FIG. 24, dimensions in the thickness direction are more emphasized than those in the planar direction.

The secondary battery 20M according to the twelfth embodiment includes two tongue-piece-included folded single-layer quantum cells illustrated in FIG. 16(C). The two tongue-piece-included folded single-layer quantum cells are located approximately at aligned positions in the lateral direction, the vertical direction, and the width direction. Here, in each tongue-piece-included folded single-layer quantum cell, the number of tongue pieces, positions of the tongue pieces in the width direction, and the like are not limited. It is preferable that the number of tongue pieces, positions of the tongue pieces in the width direction, and the like are matched in the two tongue-piece-included folded single-layer quantum cells.

In the secondary battery 20M according to the twelfth embodiment, as is clear from FIG. 24(B), the tongue-piece-included folded single-layer quantum cell 27-1 is placed on the negative electrode terminal plate 8 so that the negative electrode layer 3 is contacted thereto. The lower face of the positive electrode terminal plate 9 is in contact with the positive electrode layer 3 from the tongue piece 15 to the groove 26 of the tongue-piece-included folded single-layer quantum cell 27-1. The tongue-piece-included folded single-layer quantum cell 27-2 is arranged as being point-symmetric to the tongue-piece-included folded single-layer quantum cell 27-1. The upper face of the positive electrode terminal plate 9 is in contact with the positive electrode layer 3 from the tongue piece 15 to the groove 26 of the tongue-piece-included folded single-layer quantum cell 27-2. The negative electrode terminal plate 8 and the positive electrode terminal plate 9 are connected respectively to the extension portions 8a, 9a for exposing the negative electrode terminal and the positive electrode terminal to the outside of a mounting member (not illustrated).

According to the secondary battery 20M of the twelfth embodiment, since the two tongue-piece-included folded single-layer quantum cells 27-1, 27-2 are in parallel connection, current capacity can be increased compared to a case with one tongue-piece-included folded single-layer quantum cell. The rest of effects is the same as the secondary battery 20I according to the eighth embodiment.

As long as being capable of being applied to the secondary battery 20M of the twelfth embodiment, the modified embodiments appropriately described for the secondary batteries 20A to 20L of the abovementioned embodiments become to modified embodiments of the secondary battery 20M of the twelfth embodiment. Here, detailed description thereof will not be repeated.

(N) Thirteenth Embodiment

Figure 25A:
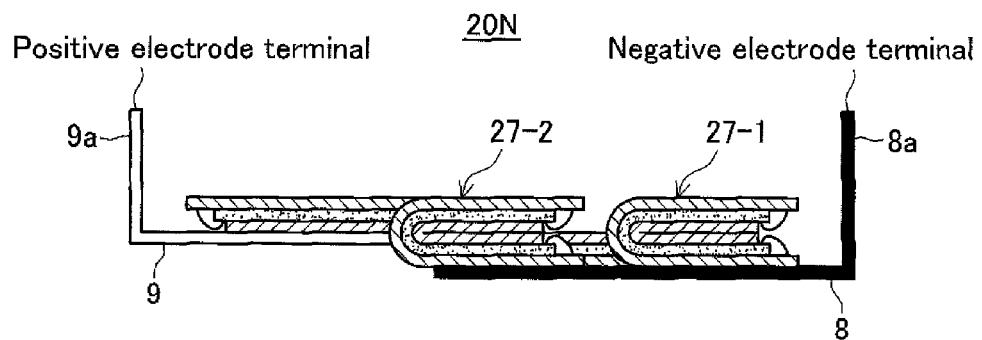
FIG. 25 is a front view and an exploded front view illustrating a structure of a secondary battery of a thirteenth embodiment.
Figure 25B:
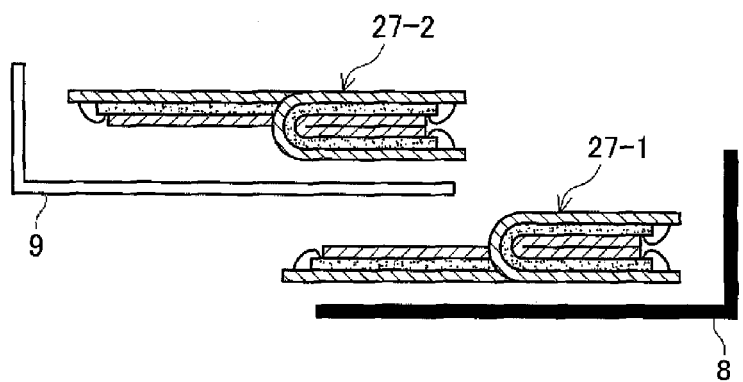

Next, a thirteenth embodiment of a secondary battery according to the present invention will be described with reference to the drawings. FIG. 25(A) is a front view illustrating a structure of a secondary battery 20N according to the thirteenth embodiment as viewing from the same direction as the sectional view of FIG. 4(B) and the front view of FIG. 16(C). In this front view, the seal 7 at the near side to be naturally seen is eliminated. FIG. 25(B) is a front view locating structural elements of the secondary battery 20N exploded in the vertical direction. In FIG. 25, dimensions in the thickness direction are more emphasized than those in the planar direction.

The secondary battery 20N according to the thirteenth embodiment includes two tongue-piece-included folded single-layer quantum cells illustrated in FIG. 16(C). The two tongue-piece-included folded single-layer quantum cells are located at different positions in the lateral direction while being located approximately at aligned positions in the vertical direction and the width direction. Here, in each tongue-piece-included folded single-layer quantum cell, the number of tongue pieces, positions of the tongue pieces in the width direction, and the like are not limited. It is preferable that the number of tongue pieces, positions of the tongue pieces in the width direction, and the like are matched in the two tongue-piece-included folded single-layer quantum cells.

In the secondary battery 20N according to the thirteenth embodiment 20N, the two tongue-piece-included folded single-layer quantum cells 27-1, 27-2 are arranged side by side with the respective folded bodies located at the right side. The tongue-piece-included folded single-layer quantum cell 27-1 at the right side is arranged so that the tongue piece 25 is extended leftward from the lower folded portion of the folded body. The tongue-piece-included folded single-layer quantum cell 27-2 at the left side is arranged so that the tongue piece 25 is extended leftward from the upper folded portion of the folded body.

The tongue piece 25 of the tongue-piece-included folded single-layer quantum cell 27-1 at the right side is placed into the groove 26 of the tongue-piece-included folded single-layer quantum cell 27-2 at the left side. The positive electrode terminal plate 9 is in contact with the lower face of the positive electrode layer 2 of the tongue piece 25 of the tongue-piece-included folded single-layer quantum cell 27-2 at the left side and the upper face of the positive electrode layer 2 of the tongue piece 25 of the tongue-piece-included folded single-layer quantum cell 27-1 at the right side. The negative electrode terminal plate 8 is in contact with the lower face of the negative electrode layer 3 of the lower folded portion of the folded body of each of the two tongue-piece-included folded single-layer quantum cells 27-1, 27-2. The negative electrode terminal plate 8 and the positive electrode terminal plate 9 are connected respectively to the extension portions 8a, 9a for exposing the negative electrode terminal and the positive electrode terminal to the outside of a mounting member (not illustrated).

According to the secondary battery 20N of the thirteenth embodiment, since the two tongue-piece-included folded single-layer quantum cells 27-1, 27-2 are in parallel connection, current capacity can be increased compared to a case with one tongue-piece-included folded single-layer quantum cell. The rest of effects is the same as the secondary battery 20I according to the eighth embodiment.

As long as being capable of being applied to the secondary battery 20N of the thirteenth embodiment, the modified embodiments appropriately described for the secondary batteries 20A to 20M of the abovementioned embodiments become to modified embodiments of the secondary battery 20N of the thirteenth embodiment. Here, detailed description thereof will not be repeated.

(O) Fourteenth Embodiment

Figure 26:
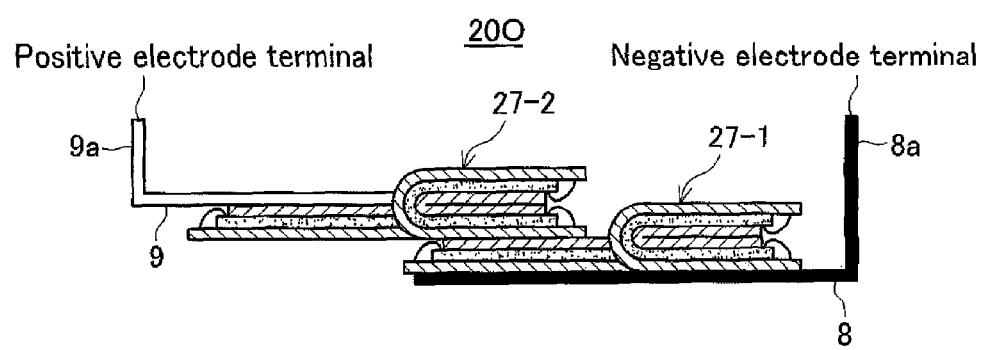
FIG. 26 is a front view illustrating a structure of a secondary battery of a fourteenth embodiment.

Next, a fourteenth embodiment of a secondary battery according to the present invention will be described with reference to the drawings. FIG. 26 is a front view illustrating a structure of a secondary battery 20O according to the fourteenth embodiment as viewing from the same direction as the sectional view of FIG. 4(B) and the front view of FIG. 16(C). In this front view, the seal 7 at the near side to be naturally seen is eliminated. In FIG. 26, dimensions in the thickness direction are more emphasized than those in the planar direction.

The secondary battery 20O according to the fourteenth embodiment includes two tongue-piece-included folded single-layer quantum cells illustrated in FIG. 16(C). The two tongue-piece-included folded single-layer quantum cells are located at different positions in the lateral direction and the vertical direction while being located approximately at aligned positions in the width direction. Here, in each tongue-piece-included folded single-layer quantum cell, the number of tongue pieces, positions of the tongue pieces in the width direction, and the like are not limited. It is preferable at least for the tongue-piece-included folded single-layer quantum cell 27-1 located at the lower stage that the tongue piece is structured to improve stability even though the tongue-piece-included folded single-layer quantum cell 27-2 located at the upper stage is placed thereon, such that the number of the tongue pieces is large, width of the tongue piece in the width direction is large, and so on.

In the secondary battery 20O according to the fourteenth embodiment, the tongue-piece-included folded single-layer quantum cell 27-2 is placed on the positive electrode layer 2 of the tongue-piece-included folded single-layer quantum cell 27-1 having the tongue piece 25 at the left side so that the negative electrode layer 3 located at the lower side is contacted thereto. The tongue-piece-included folded single-layer quantum cell 27-2 also has the tongue piece 25 which is extended leftward.

The positive electrode terminal plate 9 is in contact with the upper face of the positive electrode layer 2 of the tongue piece 25 of the tongue-piece-included folded single-layer quantum cell 27-2 at the upper-left side. The negative electrode terminal plate 8 is in contact at least with the lower face of the negative electrode layer 3 of the lower folded portion of the folded body of the tongue-piece-included folded single-layer quantum cell 27-1 at the lower-right side. The negative electrode terminal plate 8 and the positive electrode terminal plate 9 are connected respectively to the extension portions 8a, 9a for exposing the negative electrode terminal and the positive electrode terminal to the outside of a mounting member (not illustrated).

In the case of the secondary battery 20O according to the fourteenth embodiment, center positions of the two tongue-piece-included folded single-layer quantum cells 27-1, 27-2 are deviated and contact area therebetween is small. Accordingly, it is also possible, for example, that a structure to stabilize positional relation between the two tongue-piece-included folded single-layer quantum cells 27-1, 27-2 is arranged at a mounting member by design.

According to the secondary battery 20O of the fourteenth embodiment, since the two tongue-piece-included folded single-layer quantum cells 27-1, 27-2 are serial-connected, terminal voltage can be heightened compared to a case with one tongue-piece-included folded single-layer quantum cell. The rest of effects is the same as the secondary battery 20I according to the eighth embodiment.

Figure 27:
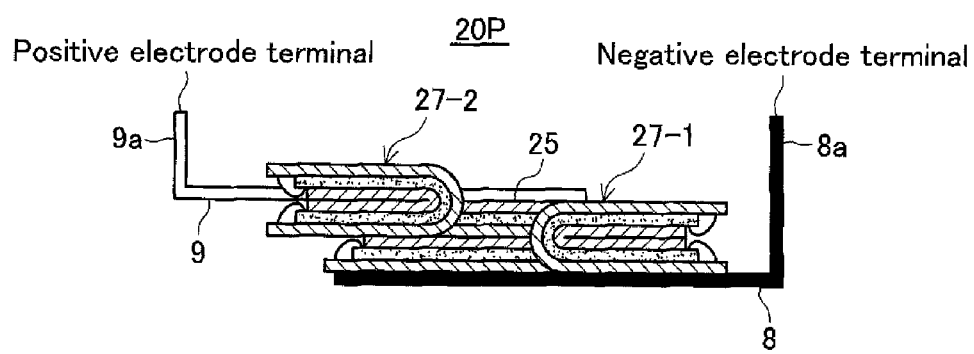
FIG. 27 is a front view illustrating a structure of a secondary battery of a modified embodiment of the fourteenth embodiment.

FIG. 27 is a front view illustrating a structure of a secondary battery 20P according to a modified embodiment of the fourteenth embodiment as viewing from the same direction as FIG. 26. In this front view, the seal 7 at the near side to be naturally seen is eliminated.

As is clear through comparison between FIGS. 26 and 27, the secondary battery 20P illustrated in FIG. 27 is the same as the secondary battery 20O of the fourteenth embodiment with the exception that the tongue piece 25 of the tongue-piece-included folded single-layer quantum cell 27-2 located at the upper side is extended in the opposite direction. In the secondary battery 20P illustrated in FIG. 27, the tongue piece 25 of the tongue-piece-included folded single-layer quantum cell 27-2 located at the upper side is extended rightward and is placed into the groove 26 of the tongue-piece-included folded single-layer quantum cell 27-1 located at the lower side. As a result, required length in the lateral direction is lessened compared to the secondary battery 20O according to the fourteenth embodiment.

As long as being capable of being applied to the secondary battery 20O (and 20P) of the fourteenth embodiment, the modified embodiments appropriately described for the secondary batteries 20A to 20N of the abovementioned embodiments become to modified embodiments of the secondary battery 20O (and 20P) of the fourteenth embodiment. Here, detailed description thereof will not be repeated.

(P) Fifteenth Embodiment

Figure 28:
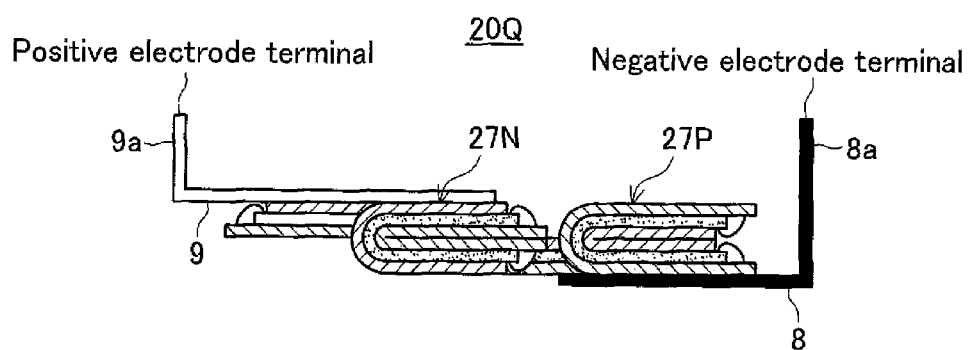
FIG. 28 is a front view illustrating a structure of a secondary battery of a fifteenth embodiment.

Next, a fifteenth embodiment of a secondary battery according to the present invention will be described with reference to the drawings. FIG. 28 is a front view illustrating a structure of a secondary battery 20Q according to the fifteenth embodiment as viewing from the same direction as FIG. 26. In this front view, the seal 7 at the near side to be naturally seen is eliminated. In FIG. 28, dimensions in the thickness direction are more emphasized than those in the planar direction.

The secondary battery 20Q according to the fifteenth embodiment includes two tongue-piece-included folded single-layer quantum cells whose electrode layers being at the inner side due to folding are different. The two tongue-piece-included folded single-layer quantum cells are located at different positions in the lateral direction while being located approximately at aligned positions in the vertical direction and the width direction. Here, in each tongue-piece-included folded single-layer quantum cell, the number of tongue pieces, positions of the tongue pieces in the width direction, and the like are not limited. It is preferable that the number of tongue pieces, positions of the tongue pieces in the width direction, and the like are matched in the two tongue-piece-included folded single-layer quantum cells.

The secondary battery 20Q according to the fifteenth embodiment includes one tongue-piece-included folded single-layer quantum cell 27P folded with the positive electrode layer 2 being at the inner side and one tongue-piece-included folded single-layer quantum cell 27N folded with the negative electrode layer 3 being at the inner side. The tongue piece 25 of the tongue-piece-included folded single-layer quantum cell 27N is extended leftward from the upper folded portion of the folded body. Meanwhile, the tongue piece 25 of the tongue-piece-included folded single-layer quantum cell 27P is extended leftward from the lower folded portion of the folded body and the tongue piece 25 is placed into the groove 26 of the tongue-piece-included folded single-layer quantum cell 27N as being in contact with the negative electrode layer 3 which is exposed in the groove 26.

The positive electrode terminal plate 9 is in contact with the upper face of the positive electrode layer 2 of the tongue piece 25 of the tongue-piece-included folded single-layer quantum cell 27N at the left side. The negative electrode terminal plate 8 is in contact with the lower face of the negative electrode layer 3 of the lower folded portion of the folded body of the tongue-piece-included folded single-layer quantum cell 27P at the right side. The negative electrode terminal plate 8 and the positive electrode terminal plate 9 are connected respectively to the extension portions 8a, 9a for exposing the negative electrode terminal and the positive electrode terminal to the outside of a mounting member (not illustrated).

According to the secondary battery 20Q of the fifteenth embodiment, since the two tongue-piece-included folded single-layer quantum cells 27P, 27N are serial-connected, terminal voltage can be heightened compared to a case with one tongue-piece-included folded single-layer quantum cell. The rest of effects is the same as the secondary battery 20I according to the eighth embodiment.

As long as being capable of being applied to the secondary battery 20Q of the fifteenth embodiment, the modified embodiments appropriately described for the secondary batteries 20A to 20P of the abovementioned embodiments become to modified embodiments of the secondary battery 20Q of the fifteenth embodiment. Here, detailed description thereof will not be repeated.

(Q) Sixteenth Embodiment

Figure 29:
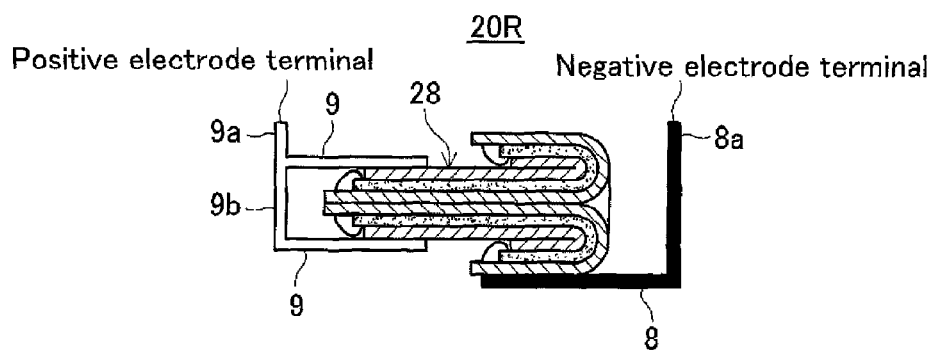
FIG. 29 is a front view illustrating a structure of a secondary battery of a sixteenth embodiment.

Next, a sixteenth embodiment of a secondary battery according to the present invention will be described with reference to the drawings. FIG. 29 is a front view illustrating a structure of a secondary battery 20R according to the sixteenth embodiment as viewing from the same direction as the sectional view of FIG. 4(B). In this front view, the seal 7 at the near side to be naturally seen is eliminated. In FIG. 29, dimensions in the thickness direction are more emphasized than those in the planar direction.

The secondary battery of each embodiment described above includes the folded single-layer quantum cell or the tongue-piece-included folded single-layer quantum cell formed by folding a single-layer quantum cell in two. In some cases, a multistage single-layer quantum cell is folded instead of the single-layer quantum cell. A secondary battery of each of the sixteenth and subsequent embodiments includes a partial four-fold single-layer quantum cell formed by folding a single-layer quantum cell in four with positional deviation generated by design. There may be a case that a multistage single-layer quantum cell is folded instead of the single-layer quantum cell.

First, a method for forming a partial four-fold single-layer quantum cell 28 will be described with reference to FIG. 30. FIGS. 30(A1), (B1), and (C1) are plane views and FIGS. 30(A2), (B2), and (C2) are front views. Here, FIGS. 30(A1), (A2), 30(B1), (B2), 30 (C1) and (C2) illustrate the same object, respectively.

First, a single-layer quantum cell illustrated in FIGS. 30(A1) and (A2) (being the same as the single-layer quantum cell 1D in FIG. 4) is folded in two with the positive electrode layer 2 being at the inner side along a folding line LN3 which is deviated from the center in the lateral direction. Thus, as illustrated in FIGS. 30(B1) and (B2), a part of the positive electrode layer 3 is exposed to the outside even after being folded. Next, the single-layer quantum cell in a state of being folded in two illustrated in FIGS. 30(B1) and (B2) is folded in two with the negative electrode layer 3 located at the lower side in FIG. 30(B2) being at the inner side along a folding line LN4 which is located at the center in the width direction. Thus, as illustrated in FIGS. 30(C1) and (C2), a part of the positive electrode layer 2 is exposed upward and downward even after being folded.

In the partial four-fold single-layer quantum cell 28, the positive electrode layer 2 of the single-layer quantum cell is exposed in part to the outside. In the partial four-fold single-layer quantum cell 28 of FIG. 30, the most part of the positive electrode layer 2 is hidden by being folded in four while a part thereof is exposed to the outside. However, it is also possible that a secondary battery adopts a partial four-fold single-layer quantum cell in which the most part of the negative electrode layer 3 is hidden by being folded in four while apart thereof is exposed to the outside.

In the secondary battery 20R according to the sixteenth embodiment, the positive electrode terminal plates 9 are separately in contact with an upper exposed face and a lower exposed face of the positive electrode layer 2 of the partial four-fold single-layer quantum cell 28, respectively. The two positive electrode terminal plates 9 are mutually connected by the positive electrode terminal connection portion 9b. The positive electrode terminal connection portion 9b includes the extension portion 9a for exposing the positive electrode terminal to the outside of a mounting member (not illustrated). The negative electrode terminal plate 8 is in contact with the lower side of the negative electrode layer 3 exposed at the lowermost side of the partial four-fold single-layer quantum cell 28. The negative electrode terminal plate 8 includes the extension portion 8a for exposing the negative electrode terminal to the outside of the mounting member (not illustrated).

According to the secondary battery 20R of the sixteenth embodiment, the positive electrode layer 2 can be also used as a structural element of a leading electrode and volume can be reduced by the electrode amount.

The secondary battery 20R according to the sixteenth embodiment also produces effects due to folding the single-layer quantum cell as described for the abovementioned embodiments. Here, due to folding in four not in two, the effect of reducing required area is higher than the abovementioned embodiments.

In the above, description is provided on the partial four-fold single-layer quantum cell which is formed by folding the single-layer quantum cell in four with positional deviation generated by design. However, it is also possible to adopt a complete four-fold single-layer quantum cell which is formed by folding a single-layer quantum cell in four as repeating twice folding in two along a symmetry axis of line symmetry while the symmetry axis direction is changed. In the complete four-fold single-layer quantum cell, since either the positive electrode layer 2 or the negative electrode layer 3 is not exposed to the outside, a terminal plate for the non-exposed electrode layer is required to be inserted to a folding gap.

As long as being capable of being applied to the secondary battery 20R of the sixteenth embodiment, the modified embodiments appropriately described for the secondary batteries 20A to 20Q of the abovementioned embodiments become to modified embodiments of the secondary battery 20R of the sixteenth embodiment. Here, detailed description thereof will not be repeated.

(R) Seventeenth Embodiment

Next, a seventeenth embodiment of a secondary battery according to the present invention will be briefly described with reference to the drawings. FIG. 31 is a front view illustrating a structure of a secondary battery 20S according to the seventeenth embodiment as viewing from the same direction as FIG. 29. In this front view, the seal 7 at the near side to be naturally seen is eliminated. In FIG. 31, dimensions in the thickness direction are more emphasized than those in the planar direction.

In the secondary battery 20S according to the seventeenth embodiment, two partial four-fold single-layer quantum cells 28-1, 28-2 are superposed in the vertical direction. Here, the positive electrode terminal plates 9 are separately in contact with externally-exposed faces of the positive electrode layers 2 of the partial four-fold single-layer quantum cells 28-1, 28-2, respectively. Further, the negative electrode terminal plates 8 are separately in contact with externally-exposed faces of the negative electrode layers 3 of the partial four-fold single-layer quantum cells 28-1, 28-2, respectively.

Since the same partial four-fold single-layer quantum cells 28-1, 28-2 are superposed, the contacting face therebetween is formed by the same electrode layers. Accordingly, the two partial four-fold single-layer quantum cells 28-1, 28-2 are parallel-connected and current capacity can be increased compared to the secondary battery 20R of the sixteenth embodiment.

Not illustrated here, it is naturally possible to structure a secondary battery with three or more of the partial four-fold single-layer quantum cells connected in parallel. Further, it is naturally possible to structure a secondary battery with two or more of the partial four-fold single-layer quantum cells connected in series. Furthermore, it is naturally possible to structure a secondary battery with a plurality of the partial four-fold single-layer quantum cells connected in series-parallel.

Description of other effects and modified embodiments is skipped for the secondary battery 20S according to the seventeenth embodiment.

(S) Eighteenth Embodiment

Figure 32A:
FIG. 32 is an explanatory view illustrating a structure of a secondary battery of an eighteenth embodiment.
Figure 32B:
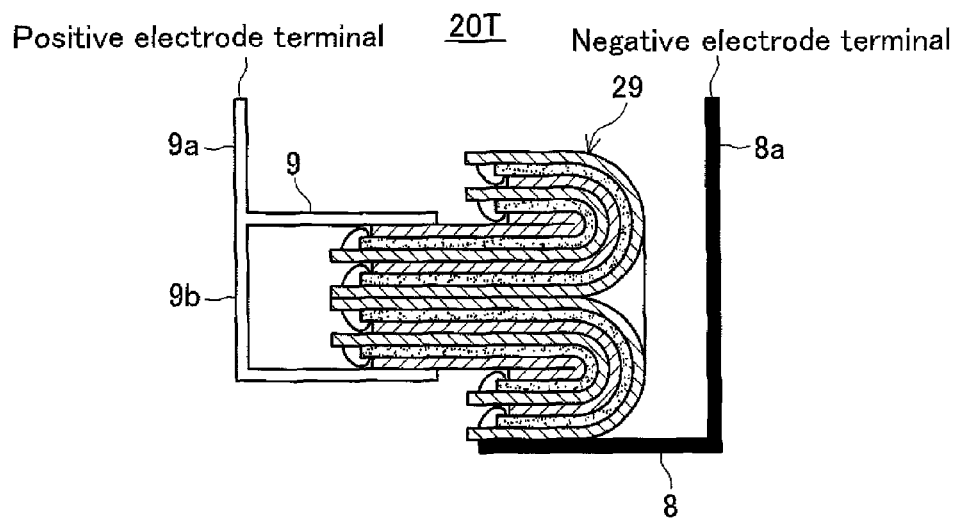

Next, an eighteenth embodiment of a secondary battery according to the present invention will be briefly described with reference to the drawings. FIG. 32(B) is a front view illustrating a structure of a secondary battery 20T according to the eighteenth embodiment as viewing from the same direction as FIG. 29. In this front view, the seal 7 at the near side to be naturally seen is eliminated. In FIGS. 32(A) and (B), dimensions in the thickness direction are more emphasized than those in the planar direction.

In the secondary battery 20T according to the eighteenth embodiment, as illustrated in FIG. 32(A), two single-layer quantum cells (being the same as the single-layer quantum cell 1D in FIG. 4) are superposed into two stages (possibly, three stages or more) in the vertical direction with top and bottom of each cell oriented in the same direction. In the above state, partial folding in four described with reference to FIG. 30 is performed, so that a partial four-fold serial-multistage single-layer quantum cell 29 is formed. Then, the positive electrode terminal plate 9 and the negative electrode terminal plate 8 are appropriately contacted to the formed partial four-fold serial-multistage single-layer quantum cell 29.

Since the secondary battery 20T according to the eighteenth embodiment adopts the partial four-fold serial-multistage single-layer quantum cell 29 which is formed from a state that the two single-layer quantum cells are serially superposed into two stages (a serial-connected state of the single-layer quantum cells), terminal voltage is heightened compared to the secondary battery 20R of the sixteenth embodiment.

Description of other effects and modified embodiments is skipped for the secondary battery 20T according to the eighteenth embodiment.

(T) Nineteenth Embodiment

Figure 33A:
FIG. 33 is an explanatory view illustrating a structure of a secondary battery of a nineteenth embodiment.
Figure 33B:
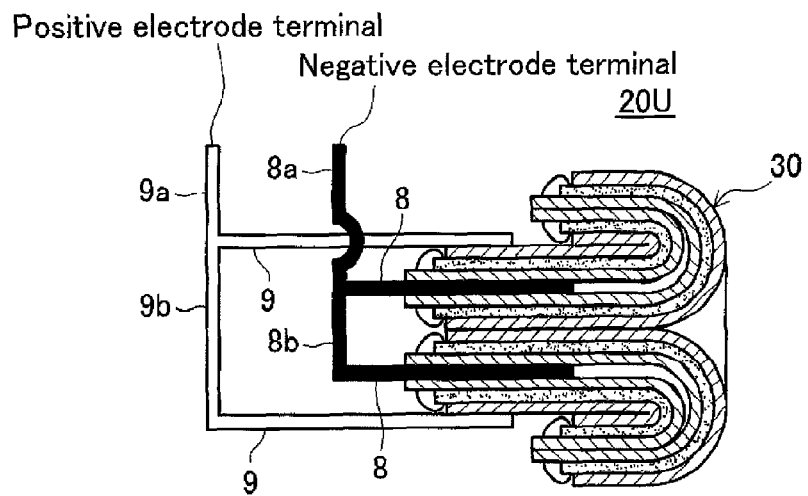

Next, an nineteenth embodiment of a secondary battery according to the present invention will be briefly described with reference to the drawings. FIG. 33(B) is a front view illustrating a structure of a secondary battery 20U according to the nineteenth embodiment as viewing from the same direction as FIG. 29. In this front view, the seal 7 at the near side to be naturally seen is eliminated. In FIGS. 33(A) and (B), dimensions in the thickness direction are more emphasized than those in the planar direction.

In the secondary battery 20U according to the nineteenth embodiment, as illustrated in FIG. 33(A), two single-layer quantum cells (being the same as the single-layer quantum cell 1D in FIG. 4) are superposed into two stages in the vertical direction with top and bottom of each cell flipped upside down so that the upper negative electrode layer 3 of the lower single-layer quantum cell is contacted to the lower negative electrode layer 3 of the upper single-layer quantum cell. Here, the negative electrode terminal plate 8 may be inserted to a midpoint between the two negative electrode layers 3. In the above state, partial folding in four described with reference to FIG. 30 is performed, so that a partial four-fold opposite-multistage single-layer quantum cell 30 is formed. Then, the positive electrode terminal plate 9 and the negative electrode terminal plate 8 are appropriately contacted to the formed partial four-fold opposite-multistage single-layer quantum cell 30

The secondary battery 20U according to the nineteenth embodiment adopts the partial four-fold opposite-multistage single-layer quantum cell 30 which is formed from a state that the two single-layer quantum cells are superposed into two stages (a parallel-connected state of the single-layer quantum cells) with opposite orientation of layering arrangement in the vertical direction. Accordingly, current capacity can be increased compared to the secondary battery 20R of the sixteenth embodiment.

Here, in a case that the multistage single-layer quantum cell is formed by folding two superposed single-layer quantum cells in two, the multistage single-layer quantum cell may be formed as well from a state that the two single-layer quantum cells are superposed into two stages (a parallel-connected state of the single-layer quantum cells) with opposite orientation of layering arrangement in the vertical direction.

Description of other effects and modified embodiments is skipped for the secondary battery 20U according to the nineteenth embodiment.

(U) Other Embodiment

A variety of modified embodiments are described in the description of the abovementioned embodiments. In addition, modified embodiments exemplified in the following may be adopted.

(U-1) In the abovementioned modified example of the secondary battery 20A of the first embodiment, a plurality of the secondary batteries 20A are mounted in a single mounting member. Here, the plurality of secondary batteries to be mounted in the single mounting member may be secondary batteries of different embodiments described above. In this case, the extension portions 8a, 9a of the plurality of secondary batteries may be connected in series, connected in parallel, or connected in series-parallel. Alternatively, the extension portions 8a, 9a may be separately exposed to the outside. It is simply required to select secondary batteries to be connected in series, in parallel, or in series-parallel in accordance with desired terminal voltage and current capacity.

Here, it is possible to combine technical ideas of the respective embodiments in a secondary battery as a single structural body. For example, it is possible to combine the parallel connection structure of the folded single-layer quantum cells 21 (21P, 21N) of the first embodiment illustrated in FIG. 7 and a serial connection structure of the first folded single-layer quantum cell 21P and the second folded single-layer quantum cell 21N illustrated in FIG. 9. More specifically, a parallel connection structure of three first folded single-layer quantum cells 21P and a parallel connection structure of three second folded single-layer quantum cells 21N are arranged one above the other to be mutually contacted in serial connection.

Figure 4B:
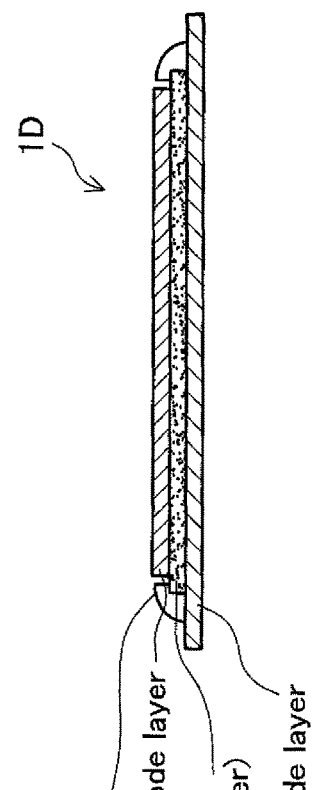
Figure 5:
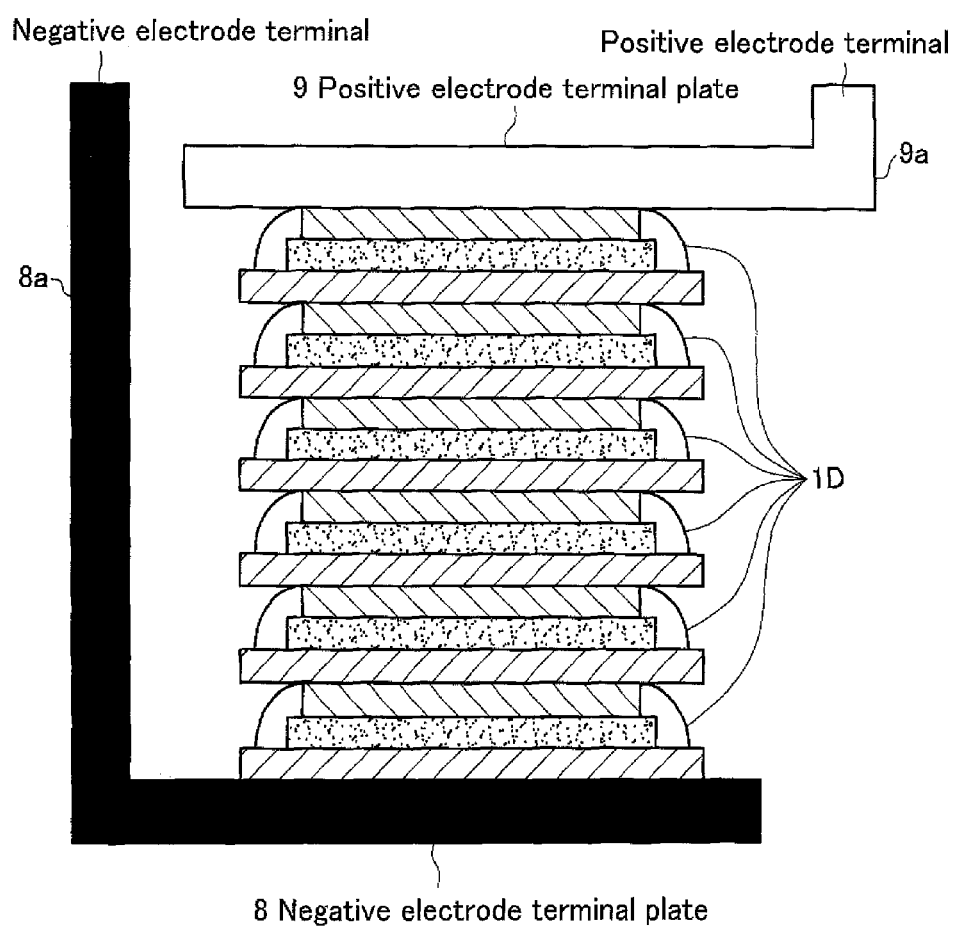
FIG. 5 is a sectional view illustrating an anticipatable structure of a secondary battery in which a plurality of single-layer cells are serial-connected with each single-layer cell being an all-solid-state secondary cell.
Figure 34:
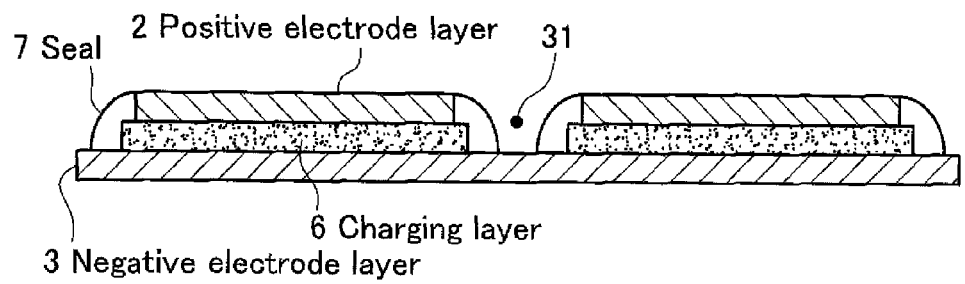
FIG. 34 is an explanatory view of a secondary battery of a first modified embodiment.

(U-2) In the abovementioned embodiments, any special consideration for being folded is not paid to the single-layer quantum cell (see FIG. 4). It is also possible to fold a single-layer quantum cell to which special consideration for being folded is paid. FIG. 34 is a sectional view of a single-layer quantum cell according to such a modified embodiment (see FIG. 4(B)). At a belt-shaped section 31 to be a bent section of folding in two extended in the normal direction of the depiction of the drawing, only one the negative electrode layer 3 (may be the negative electrode layer formed on the conductive base plate 12) is formed but the charging layer 6 and the positive electrode layer 2 are not formed, so that dynamic resistance against folding is reduced. In the case of the modified example, it is also possible to perform folding with a circular insulation rod member located at the belt-shaped section which is concaved due to absence of the charging layer 6 and the positive electrode layer 2. Further, not illustrated in the drawings, even in a case that the negative electrode layer 3, the charging layer 6, and the positive electrode layer 2 are arranged on the folding line, it is also possible to form perforations along the folding line so that dynamic resistance against folding is reduced.

Figure 35:
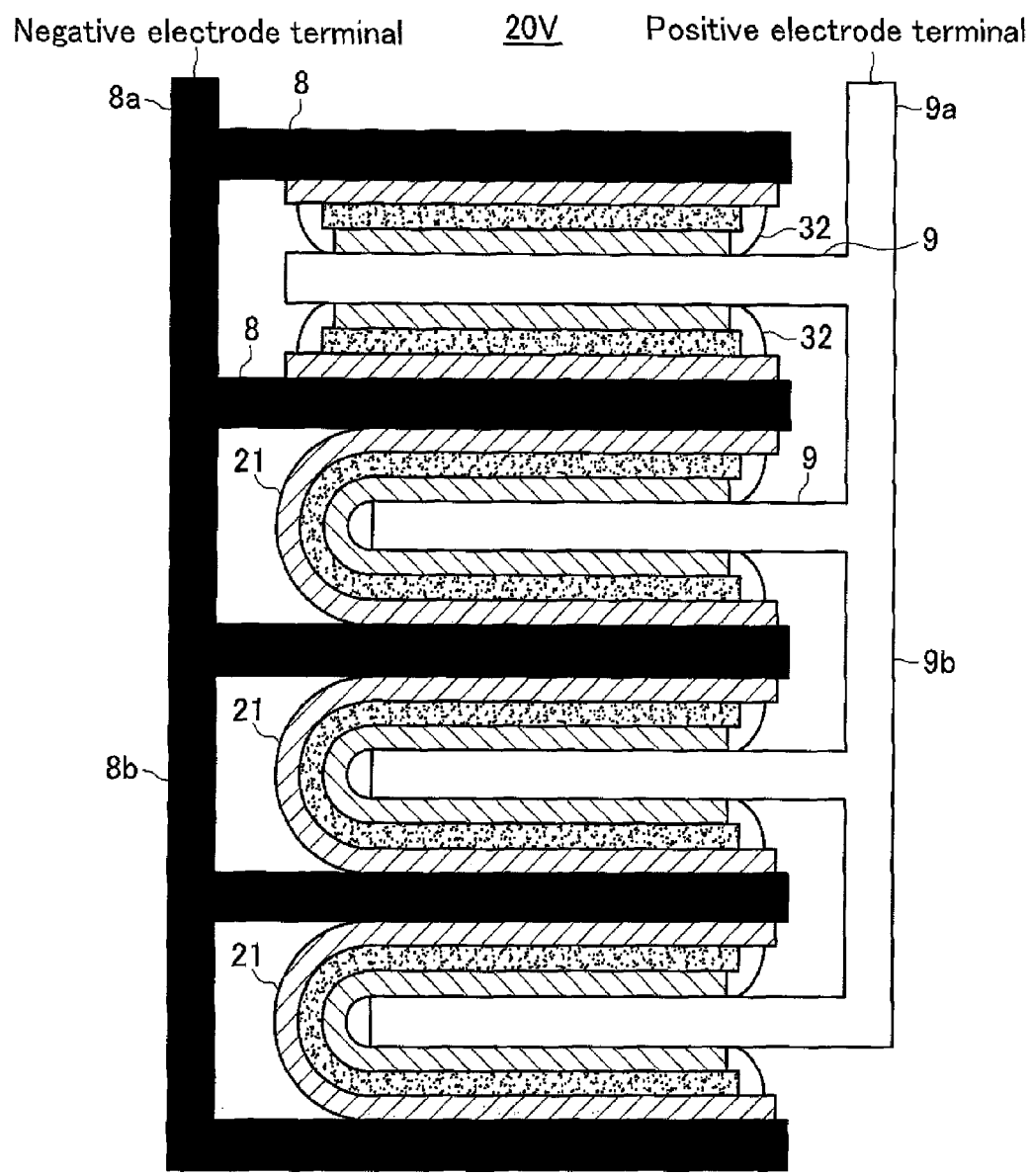
FIG. 35 is a sectional view illustrating a structure of a secondary battery of a second modified embodiment.

(U-3) In the respective embodiments, every cell to be layered is obtained by folding a single-layer quantum cell. However, a single-layer quantum cell which is not folded may be adopted as a part of a layering element. FIG. 35 is a sectional view illustrating a structure of a secondary battery 20V according to the modified embodiment. The secondary battery 20V is a modified embodiment of the secondary battery 20A of the first embodiment illustrated in FIG. 7. Here, two single-layer quantum cells 32 are layered at the uppermost side with sides of the positive electrode layers 2 mutually faced. The positive electrode terminal plate 9 is arranged as being sandwiched between the mutually-faced positive electrode layers 2. Further, the negative electrode layers 3 of the two single-layer quantum cells 32 are in contact respectively with different negative electrode terminal plates 8. According to the structure that the single-layer quantum cell having small area without being folded is adopted to be layered, even when defectiveness is detected at a single-layer quantum cell to be folded which is cut out from an original large sheet, a half portion thereof, as long as being normal, can be used in the secondary battery 20V.

(U-4) In the abovementioned embodiments, a plurality of the folded single-layer quantum cells are arranged (layered) one above the other. However, it is also possible that a plurality of the folded single-layer quantum cells are arranged side by side (e.g., as being a secondary battery obtained by rotating the state of FIG. 7 counterclockwise or clockwise by 90 degrees). That is, a plurality of the folded single-layer quantum cells arranged in parallel in a state that the lateral direction is rotated to the vertical direction in each drawing may be mounted in a mounting member. Similarly, in a case of the secondary battery of each embodiment which adopts only one folded single-layer quantum cell, the folded single-layer quantum cell in a state that the lateral direction is rotated to the vertical direction in each drawing may be mounted in a mounting member.

(U-5) In the abovementioned embodiments, the single-layer cell to be layered is structured as a quantum cell. However, not limited to a quantum cell, it is simply required to adopt a secondary cell having a sheet shape (parallel flat plate shape). For example, as long as being capable of being folded, a solid-state lithium ion secondary cell may be layered in the abovementioned embodiments.

The invention claimed is:

1. A secondary battery, comprising an all-solid-state single-layer secondary cell having a folded structure in which a storage layer sandwiched between a positive electrode layer and a negative electrode layer is folded in two or four,
wherein the single-layer secondary cell having the folded structure includes at least one non-folded tongue piece which is not folded in two,
at least one of the positive electrode layer and the negative electrode layer at the non-folded tongue piece is in contact with a positive electrode terminal member or a negative electrode terminal member,
the positive electrode layer is a p-type doped metal oxide semiconductor layer,
the storage layer is a translucent metal oxide semiconductor charging layer having a band gap of at least a predetermined value, and
a number of energy levels with no electrons are generated in the band gap, said energy levels enabling charging of the secondary cell by capture of electrons and discharge of the secondary cell by release of electrons.

2. A secondary battery, comprising an all-solid-state single-layer secondary cell having a folded structure in which a storage layer is sandwiched between a positive electrode layer and a negative electrode layer,
wherein the folded structure of the single-layer secondary cell is a four-fold structure in which a sheet-shaped single-layer secondary cell is folded in two in a state that a first electrode layer corresponding to one of the positive electrode layer and the negative electrode layer is at the inner side so that a part of the first electrode layer at the inner side is exposed, and subsequently, folded in two in a state where only a second electrode layer corresponding to the other of the positive electrode layer and the negative electrode layer is exposed to the outside,
the positive electrode layer is a p-type doped metal oxide semiconductor layer,
the storage layer is a translucent metal oxide semiconductor charging layer having a band gap of at least a predetermined value, and
a number of energy levels with no electrons are generated in the band gap, said energy levels enabling charging of the secondary cell by capture of electrons and discharge of the secondary cell by release of electrons.

3. The secondary battery according to claim 2,
wherein the single-layer secondary cell having the folded structure is replaced by a folded member which is obtained by folding a plurality of single-layer secondary cells in two or four in a state of being superposed in a multistage manner.

4. The secondary battery according to claim 2,
wherein, in the single-layer secondary cell having the folded structure, the negative electrode layer or the positive electrode layer is replaced with a pair of a conductive base plate and the negative electrode layer formed thereon or a pair of a conductive base plate and the positive electrode layer formed thereon.

5. The secondary battery according to claim 1,
wherein the single-layer secondary cell having the folded structure is replaced by a folded member which is obtained by folding a plurality of single-layer secondary cells in two or four in a state of being superposed in a multistage manner.

6. The secondary battery according to claim 1,
wherein, in the single-layer secondary cell having the folded structure, the negative electrode layer or the positive electrode layer is replaced with a pair of a conductive base plate and the negative electrode layer formed thereon or a pair of a conductive base plate and the positive electrode layer formed thereon.

7. The secondary battery according to claim 1, wherein the single-layer secondary cell is folded in two and said at least one of the positive electrode layer and the negative electrode layer is on an inner side of a folded portion of the single-layer secondary cell.

8. The secondary battery according to claim 1, wherein the single-layer secondary cell is folded in two, and the at least one tongue piece is formed by at least one slit in the single-layer secondary cell with said at least one of the positive electrode layer and the negative electrode layer on an inner side of a folded portion of the single-layer secondary cell.

9. The secondary battery according to claim 1, wherein a plurality of the single-layer secondary cells each having the folded structure are arranged in parallel and adjacent single-layer secondary cells each having the folded structure are electrically connected directly or via a positive electrode terminal member or a negative electrode terminal member, so that at least one of current capacity increasing and terminal voltage heightening is achieved.

10. The secondary battery according to claim 9, wherein a single-layer secondary cell having a first folded structure of being folded in two with the positive electrode layer being at the inner side and a single-layer secondary cell having a second folded structure of being folded in two with the negative electrode layer being at the inner side are included as the elements to be arranged in parallel.

11. The secondary battery according to claim 2, wherein a plurality of the single-layer secondary cells each having the folded structure are arranged in parallel and adjacent single-layer secondary cells each having the folded structure are electrically connected directly or via a positive electrode terminal member or a negative electrode terminal member, so that at least one of current capacity increasing and terminal voltage heightening is achieved.

12. The secondary battery according to claim 11, wherein a single-layer secondary cell having a first folded structure of being folded in two with the positive electrode layer being at the inner side and a single-layer secondary cell having a second folded structure of being folded in two with the negative electrode layer being at the inner side are included as the elements to be arranged in parallel.

\* \* \* \* \*